United States Patent
Ino

(10) Patent No.: US 10,620,602 B2
(45) Date of Patent: Apr. 14, 2020

(54) PROGRAMMABLE CONTROLLER

(71) Applicant: FANUC CORPORATION, Yamanashi (JP)

(72) Inventor: Yasuyuki Ino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 6 days.

(21) Appl. No.: 15/878,753

(22) Filed: Jan. 24, 2018

(65) Prior Publication Data

US 2018/0210414 A1 Jul. 26, 2018

(30) Foreign Application Priority Data

Jan. 25, 2017 (JP) ................................. 2017-011228

(51) Int. Cl.
*G05B 19/042* (2006.01)
*G05B 19/05* (2006.01)

(52) U.S. Cl.
CPC ....... *G05B 19/0426* (2013.01); *G05B 19/056* (2013.01); *G05B 2219/13188* (2013.01); *G05B 2219/21059* (2013.01); *G05B 2219/23333* (2013.01)

(58) Field of Classification Search
CPC .............. G05B 19/0426; G05B 19/056; G05B 2219/13188; G05B 2219/21059; G05B 2219/23333
See application file for complete search history.

(56) References Cited

U.S. PATENT DOCUMENTS 8,645,935 B2 * 2/2014 Barua ..................... G06F 8/53
717/153

FOREIGN PATENT DOCUMENTS

| JP | 11305807 A | * | 11/1999 | ............ G05B 19/48 |
| JP | H11-305807 A | | 11/1999 | |
| JP | 2002358102 A | | 12/2002 | |
| JP | 2003-122409 A | | 4/2003 | |
| JP | 2006-294013 A | | 10/2006 | |
| JP | 2007241570 A | | 9/2007 | |
| JP | 5019021 B2 | * | 9/2012 | ............... G06F 9/44 |
| JP | 2013-97460 A | | 5/2013 | |

* cited by examiner

*Primary Examiner* — Thomas C Lee
*Assistant Examiner* — Anzuman Sharmin
(74) *Attorney, Agent, or Firm* — Hauptman Ham, LLP

(57) ABSTRACT

A programmable controller capable of checking accessible signal addresses for each of ladder programs is provided. The programmable controller includes signal address setting extraction means for extracting an available address setting table from each of the ladder programs; a signal address overlap determination section for determining whether there is an overlap between the respective ranges of signal addresses used as signal write destinations by the ladder programs, based on the available address setting tables extracted by the signal address setting extraction means; and a ladder program execution section for executing the plurality of ladder programs if the signal address overlap determination section determines that there is no overlap between the respective ranges of signal addresses used as signal write destinations by the ladder programs.

3 Claims, 22 Drawing Sheets

FIG.4

AVAILABLE ADDRESS SETTING TABLE
OF PLC1 DIVIDED LADDER 1

| NUMBER | ADDRESS RANGE | R/W |
|---|---|---|
| 1 | D0~D2999 | RW |
| 2 | R0~R2999 | RW |
| 3 | E0~E1999 | RW |
| ... | ... | ... |

AVAILABLE ADDRESS SETTING TABLE
OF PLC1 DIVIDED LADDER 2

| NUMBER | ADDRESS RANGE | R/W |
|---|---|---|
| 1 | D3000~D4999 | RW |
| 2 | R2000~R3999 | RW |
| 3 | E2000~E3999 | RW |
| ... | ... | ... |

AVAILABLE ADDRESS SETTING
TABLE OF PLC2 LADDER

| NUMBER | ADDRESS RANGE | R/W |
|---|---|---|
| 1 | D0000~D3999 | RW |
| 2 | E4000~E4999 | RW |
| 3 | G0~G999 | RW |
| ... | ... | ... |

ADDRESS SHARING INFORMATION OF PLC2
LADDER

| NUMBER | SHARING SOURCE ADDRESS | SHARING DESTINATION ADDRESS |
|---|---|---|
| 1 | E0000~E7999 | PLC1:E0000~E7999 |
| 2 | G0~G999 | PLC1:G1000~G1999 |
| ... | ... | ... |

FIG.5

| NUMBER | ADDRESS SPACE | ADDRESS RANGE | LADDER PROGRAM |
|---|---|---|---|
| 1 | PLC1 | D0~D2999 | PLC1 DIVIDED LADDER 1 |
| 2 | PLC1 | R0~R2999 | PLC1 DIVIDED LADDER 1 |
| 3 | PLC1 | E0~E1999 | PLC1 DIVIDED LADDER 1 |
| 4 | PLC1 | D3000~D4999 | PLC1 DIVIDED LADDER 2 |
| 5 | PLC1 | R2000~R3999 | PLC1 DIVIDED LADDER 2 |
| 6 | PLC1 | E2000~E3999 | PLC1 DIVIDED LADDER 2 |
| 7 | PLC2 | D0~D3999 | PLC2 LADDER |
| 8 | PLC1 | E4000~E4999 | PLC2 LADDER |
| 9 | PLC1 | G1000~G1999 | PLC2 LADDER |
| ⋮ | ⋮ | ⋮ | ⋮ |

# PROGRAMMABLE CONTROLLER

RELATED APPLICATIONS

The present application claims priority to Japanese Patent Application Number 2017-011228, filed Jan. 25, 2017, the disclosure of which is hereby incorporated by reference herein in its entirety.

BACKGROUND OF THE INVENTION

1. Field of the Invention

The present invention relates to a programmable controller and particularly relates to a programmable controller capable of checking accessible signal addresses for each of ladder programs.

2. Description of the Related Art

Some programmable controllers (programmable logic controllers, PLCs) used in a CNC (numerical controller) or the like create a plurality of ladder programs which correspond to respective objects to be controlled including a main body portion of a machine that performs machining, a tool management mechanism portion that manages a tool used for machining, and a peripheral such as a loader, and cause these ladder programs to simultaneously work in parallel.

The following two configurations are used to cause a plurality of ladder programs to work on one CNC, depending on the type of a signal address space from/to which a ladder program working on a programmable controller reads/writes:

(1) a configuration in which the CNC and the plurality of ladder programs of the programmable controller share one signal address space (FIG. 17, divided-ladder configuration); and (2) a configuration in which an independent signal address space is provided for each ladder program executed on the programmable controller (FIG. 18, multisystem programmable controller configuration).

In a programmable controller having a divided-ladder configuration, writing to the same signal address by a plurality of ladder programs may cause a malfunction. Prior art techniques for preventing this problem include means for detecting cross-reference data on signal addresses used in each ladder program, searching the detection result for writing to the same address, and displaying the writing (for example, Japanese Patent Application Laid-Open No. 2002-358102).

Meanwhile, in a programmable controller having a multisystem programmable controller configuration, each ladder program cannot write a signal to a signal address space of other ladder program, and cannot read a signal from a signal address space of other ladder program. Accordingly, a plurality of ladder programs do not write to the same signal address. However, a signal cannot be sent or received between ladder programs, and the ladder programs cannot work in cooperation. In a multisystem programmable controller configuration, to allow ladder programs to work in cooperation, a shared signal address space from/to which a plurality of ladder programs can read/write needs to be prepared. Such a shared signal address space does not necessarily have a sufficient region size, and means for preventing duplicate writing from a plurality of ladder programs is needed as in a programmable controller having a divided-ladder configuration. Prior art techniques for dealing with such a problem include means for allowing part of a signal address space of a ladder program to be referred to by other ladder programs and setting a signal address region disclosed to other ladder programs as a shared memory region (for example, Japanese Patent Application Laid-Open No. 2007-241570).

In the case where ladder programs working on a programmable controller having a divided-ladder configuration are created, as shown in FIG. 19, a range of addresses to which each ladder program writes is usually defined exclusively in advance. When each ladder is created, programming is performed within the defined signal address range. However, as shown in FIG. 20, duplicate writing due to a mistake in programming to an address to which other ladder program writes causes a malfunction of the machine. Such duplicate writing needs to be prevented. To do so, the creator of the ladder needs to do the work of checking addresses to which the ladder programs write. This work is very troublesome. In principle, a function to analyze a ladder program can be implemented in a programmable controller. With the function, when ladder programs are executed, contents of the ladders can be analyzed, and duplicate writing can be detected. However, when the ladder programs are large, data to be checked are complicated and large. Accordingly, there is a problem in that a very heavy load is placed on a ladder program execution system.

On the other hand, in the case where ladder programs working on a programmable controller having a multisystem programmable controller configuration are created, as shown in FIG. 21, each ladder program has an independent signal address space. Even signal addresses having the same expression are actually disposed in different signal address spaces. Accordingly, without special attention paid to write destination signal addresses, the operation of other ladder program is not affected. However, direct read/write from/to a signal address space of other ladder program is not allowed, and information cannot be directly shared between programs by a usual method. For example, as shown in FIG. 22, the state of the CNC and the like are dealt with by only a specific ladder program (PLC ladder 1), and there is a problem in that other ladder program (PLC ladder 2) cannot perform direct read/write.

In a programmable controller having the configuration shown in FIG. 22, to allow other ladder program (PLC ladder 2) to refer to the state (alarm state, mode state, and the like) of the CNC, the other ladder program (PLC ladder 2) needs to send/receive information to/from the ladder program (PLC ladder 1) controlling the CNC. For such a purpose, as shown in FIG. 23, a readable and writable address space shared between the ladder programs can be prepared. In such a configuration, a ladder for writing necessary information to the shared address space is added to the ladder program (PLC ladder 1) controlling the CNC, and other ladder program refers to information in the shared address space with a ladder. However, this configuration needs a ladder added to the ladder program (PLC ladder 1) controlling the CNC, requires design cost, and has a disadvantage in the volume of the ladder programs, the volume of addresses (memory) used, and performance. Further, with regard to dealing with the shared address space, exclusive use needs to be guaranteed. Accordingly, a problem similar to that of the divided-ladder configuration also occurs.

SUMMARY OF THE INVENTION

Accordingly, an object of the present invention is to provide a programmable controller capable of checking accessible signal addresses for each of ladder programs.

In the present invention, information on a signal address region to/from which a ladder program accesses (writes/reads) is embedded in an executable object of the ladder program as an available address setting table. When a plurality of ladder programs are executed on a programmable controller, whether or not there is an overlap between write destination signal address regions of the respective ladder programs is checked using the available address setting table extracted from each ladder program. A function to perform the checking is implemented in the programmable controller to solve the above-described problems.

An invention according to claim 1 of the present invention is a control device.

With the present invention, when a plurality of ladder programs are executed, an overlap between signal addresses to which the ladder programs write can be checked without placing a heavy load on the system, and a malfunction caused by duplicate writing can be prevented.

BRIEF DESCRIPTION OF THE DRAWINGS

These and other objects and features of the present invention will become apparent from the following description of exemplary embodiments with reference to the accompanying drawings in which:

FIG. 4 is a view showing an example of available address setting tables and address sharing information embedded in the ladder programs;

FIG. 5 is a view showing an example of writable range information;

DETAILED DESCRIPTION OF THE PREFERRED EMBODIMENTS

Hereinafter, embodiments of the present invention will be described with reference to the drawings. First, referring to FIGS. 1 and 2, an overview of a method according to the present invention for managing access to a signal address space by a ladder program will be provided.

Figure 1:
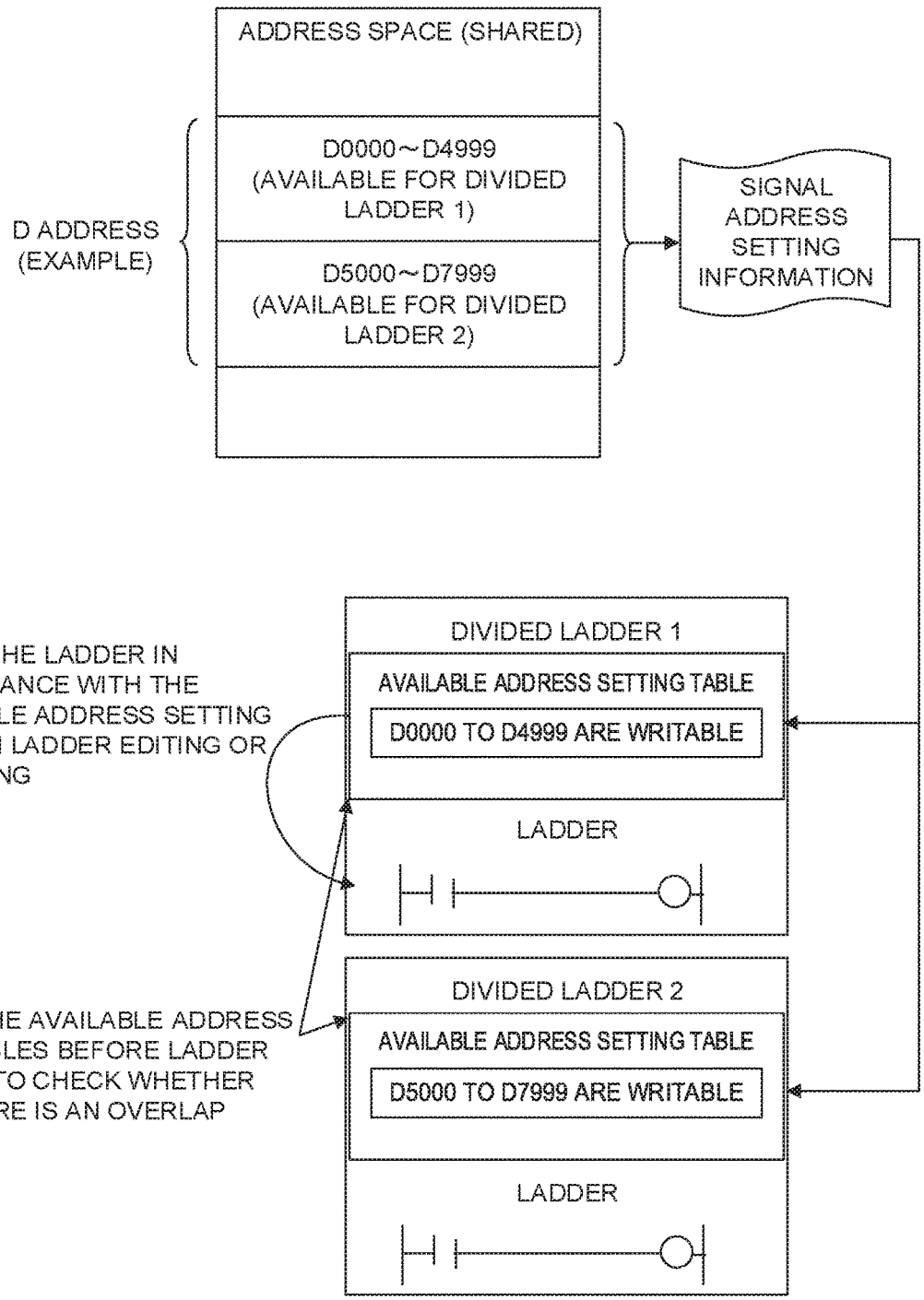
FIG. 1 is a view illustrating a method according to the present invention for managing access to a signal address space by a ladder program in the case of a configuration in which a signal address space is shared by a plurality of ladder programs.

FIG. 1 is a view illustrating a method according to the present invention for managing access to a signal address space by a ladder program in the case of a configuration in which a signal address space is shared by a plurality of ladder programs.

In an access management method according to one embodiment of the present invention, in the case of a divided-ladder configuration in which a signal address space is shared by a plurality of ladder programs, signal address setting information defining ladder programs capable of accessing part of each signal address space is created in advance. When each ladder program is edited or compiled (when an executable object is created), a check is made for each ladder program to determine that the range of the signal address space from/to which the ladder program reads/writes does not contradict a writable range defined in the signal address setting information. Then, when each ladder program is compiled (when an executable object of the ladder program is created), information on the writable range relating to the own ladder program which is defined in the signal address setting information is embedded in an executable object as an available address setting table.

Then, before the execution of the ladder programs, a programmable controller retrieves the available address setting tables from the executable objects of the ladder programs to be executed, and compares the available address setting tables to check whether or not there is an overlap between ladder programs in information on writable ranges for the same address space. If there is no overlap, the programmable controller determines that there is no duplicate writing, and executes the ladder programs. If an overlap is detected, there is a possibility of duplicate writing, and the programmable controller does not execute the ladder programs and brings the ladder programs to an alarm state.

Figure 2:
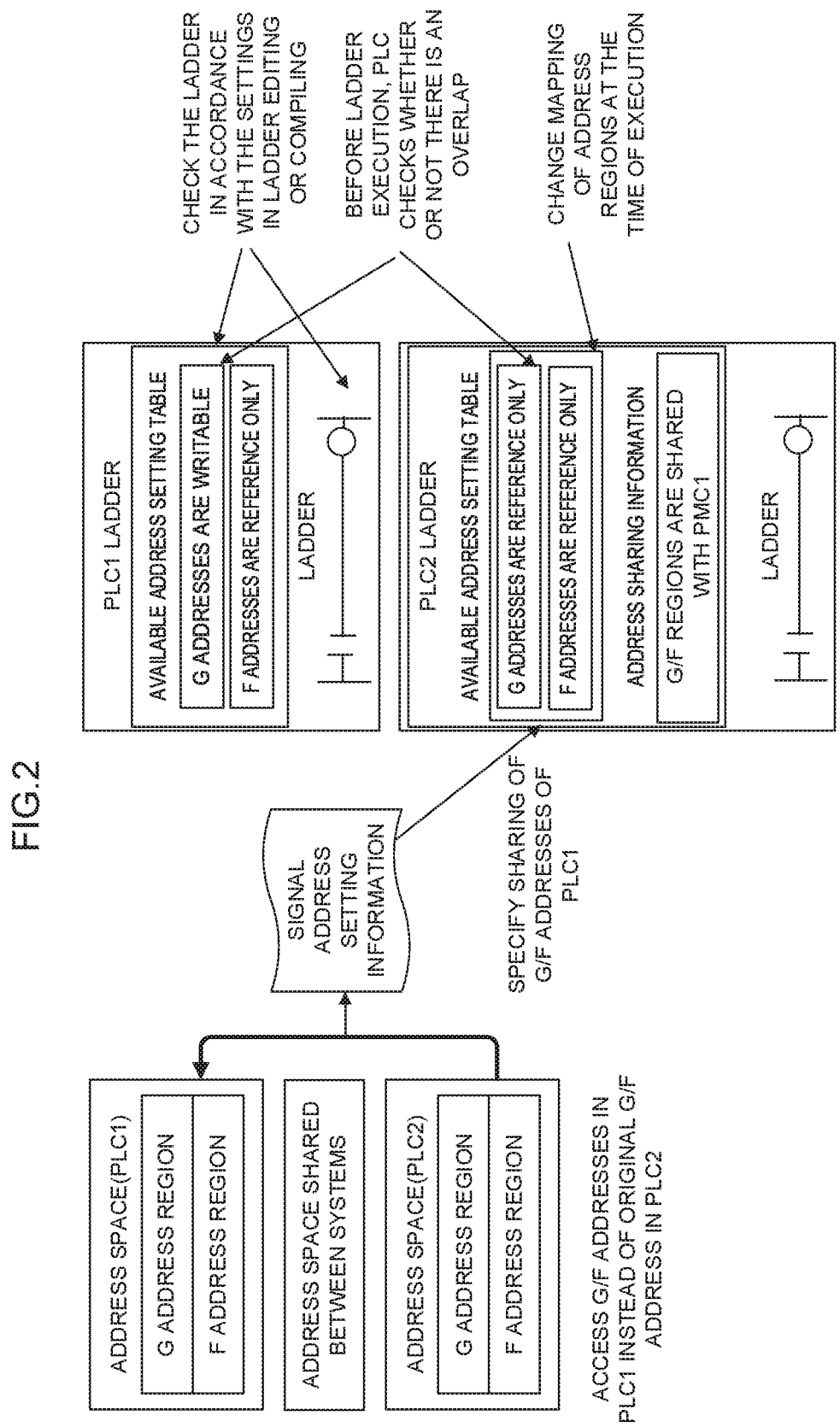
FIG. 2 is a view illustrating a method according to the present invention for managing access to a signal address space by a ladder program in the case of a multisystem programmable controller configuration in which an independent signal address space is provided for each ladder program executed on a programmable controller.

FIG. 2 is a view illustrating a method according to the present invention for managing access to a signal address space by a ladder program in the case of a multisystem programmable controller configuration in which an independent signal address space is provided for each ladder program executed on a programmable controller.

In an access management method according to one embodiment of the present invention, in the case of a multisystem programmable controller configuration in which an independent signal address space is provided for each ladder program executed on a programmable controller, each ladder program can be defined, in signal address setting information, to share part of a signal address space of other ladder program. At that time, an access range can be defined in a shared signal address region. Further, in an access management method according to one embodiment of the present invention, when each ladder program is compiled (when an executable object of the ladder program is created), information on signal address region sharing relating to the own ladder program which is included in the signal address setting information is embedded in an executable object as address sharing information.

Then, before the execution of the ladder programs, the programmable controller retrieves address sharing information from the executable objects of the ladder programs to be executed, and changes, based on the address sharing information, the mapping of address regions referred to when the ladder programs are executed so that the shared address region can be referred to as settings are defined in the address sharing information. Further, before the execution of the ladder programs, the programmable controller checks whether or not there is an overlap between ladder programs in information on writable ranges for the same address space in consideration of the address sharing information.

Next, the operation of the programmable controller according to the one embodiment of the present invention will be briefly described with reference to FIGS. 3 to 5. The following description provides an example in which the programmable controller includes two systems, PLC1 and PLC2, (multisystem programmable controller configuration). The system PLC1 makes two ladder programs work (divided-ladder configuration), and the system PLC2 makes a single ladder program work.

Figure 3:
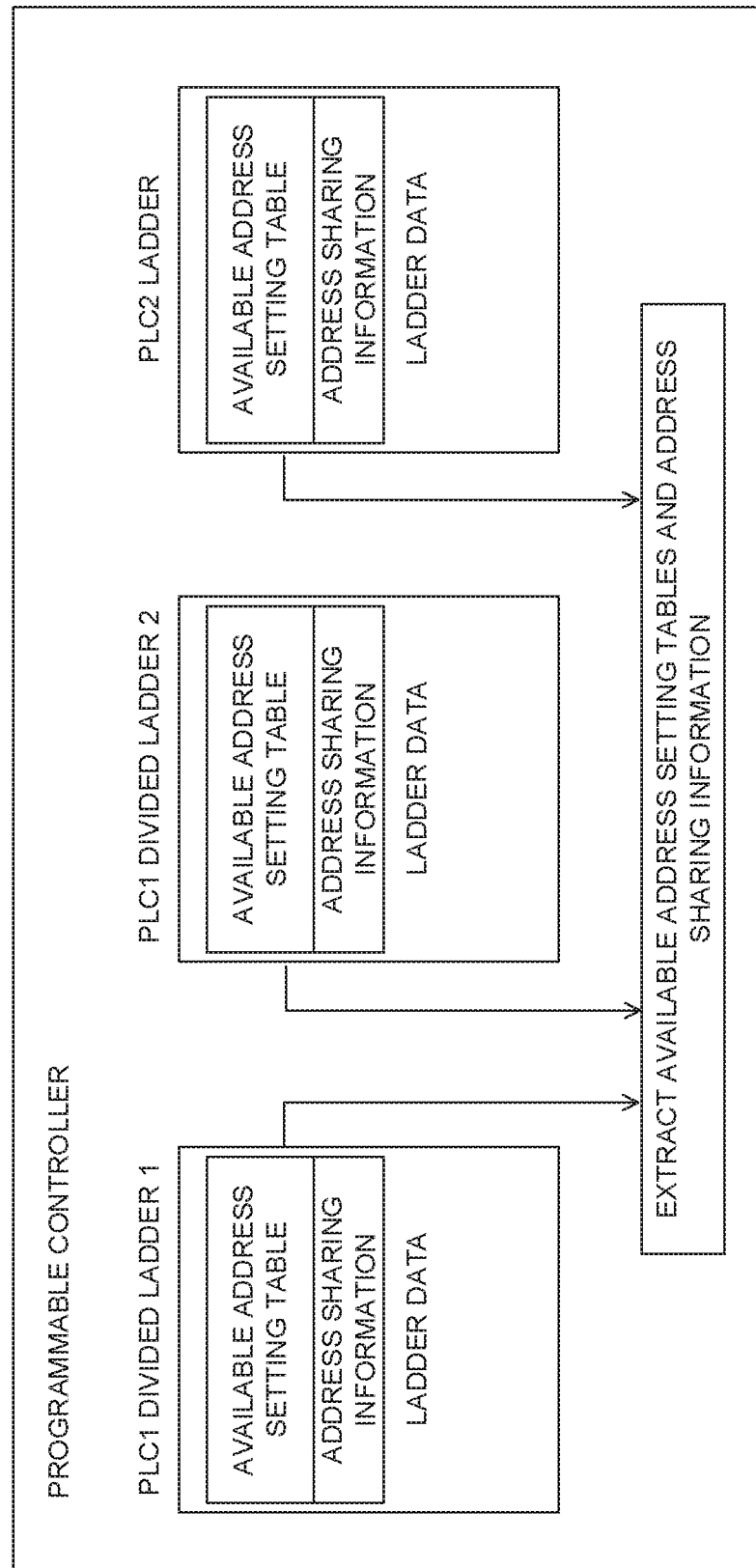
FIG. 3 is a view illustrating the extraction of "available address setting tables" and "address sharing information" from ladder programs in a programmable controller according to one embodiment of the present invention.

Before executing ladder programs, the programmable controller according to the one embodiment of the present invention extracts "available address setting table" and "address sharing information" stored in each ladder program as shown in FIG. 3.

FIG. 4 shows an example of available address setting tables embedded in PLC1 divided ladder 1, PLC1 divided ladder 2, and PLC2 ladder and address sharing information embedded in PLC2 ladder.

In the example shown in FIG. 4, PLC1 divided ladder 1 and PLC1 divided ladder 2 include no address sharing information, and PLC2 ladder includes address sharing information in which settings are made so that PLC2 ladder may refer to E addresses and G addresses of PLC1.

The programmable controller according to the one embodiment of the present invention creates writable range information based on the available address setting tables extracted from the ladder programs FIG. 5 shows an example of writable range information. The writable range information is information which is created based on "available address setting tables" and "address sharing information" extracted from the ladder programs and in which the relationship among access source ladder program, signal address space of access destination, and address range of access destination is summarized. As shown in FIG. 5, in the case where address sharing information is embedded in a ladder program, the programmable controller maps (converts) the signal address space and the address range set in the available address setting table of the ladder program based on settings in the address sharing information.

Then, the programmable controller according to the embodiment of the present invention checks whether or not two or more ladder programs write to the same address range of the same signal address space based on the writable range information, and determines whether to start the execution of the ladder programs based on the check result.

Next, the operation of (processing performed by) the programmable controller according to the embodiment of the present invention will be more specifically described with reference to FIGS. 6 to 9.

Figure 6:
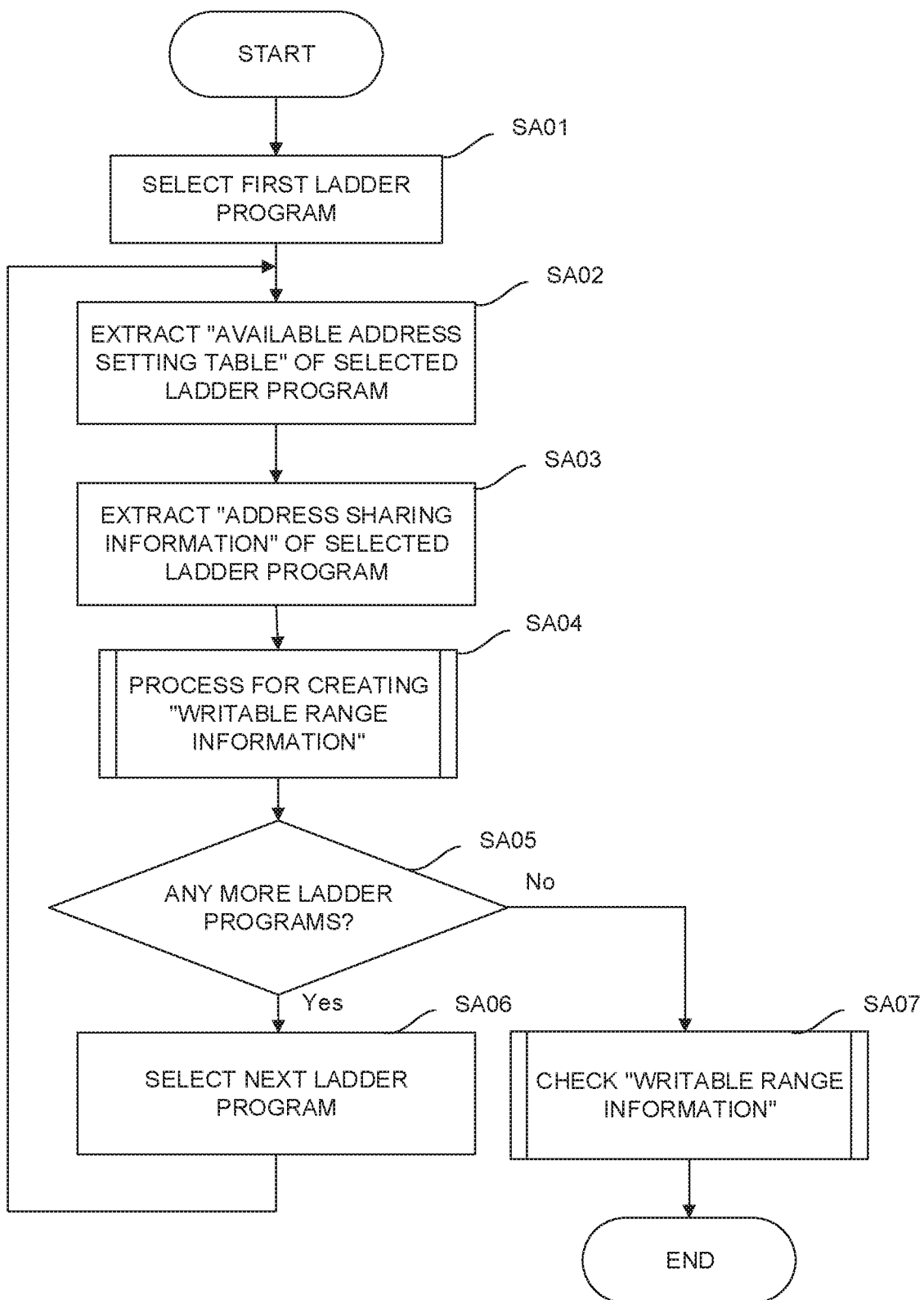
FIG. 6 is an overview flowchart of a process that is performed by the programmable controller according to the one embodiment of the present invention when the execution of the ladder programs is started.

FIG. 6 is an overview flowchart of a process that is performed by the programmable controller according to one embodiment of the present invention when the execution of the ladder programs is started.

[Step SA01] The programmable controller selects the first ladder program among a plurality of ladder programs to be executed.

[Step SA02] The programmable controller extracts the "available address setting table" of the selected ladder program.

[Step SA03] The programmable controller extracts "address sharing information" of the selected ladder program.

[Step SA04] The programmable controller executes a process for creating "writable range information" based on the extracted "available address setting table" and "address sharing information".

[Step SA05] The programmable controller determines whether there are any more ladder programs from which "available address setting table" and "address sharing information" have not been extracted yet. If there is a next ladder program, the programmable controller goes to Step SA06; if there is no more ladder program, the programmable controller goes to Step SA07.

[Step SA06] The programmable controller selects the next ladder program, and goes to Step SA02.

[Step SA07] The programmable controller executes a process for checking the created "writable range information".

Figure 7:
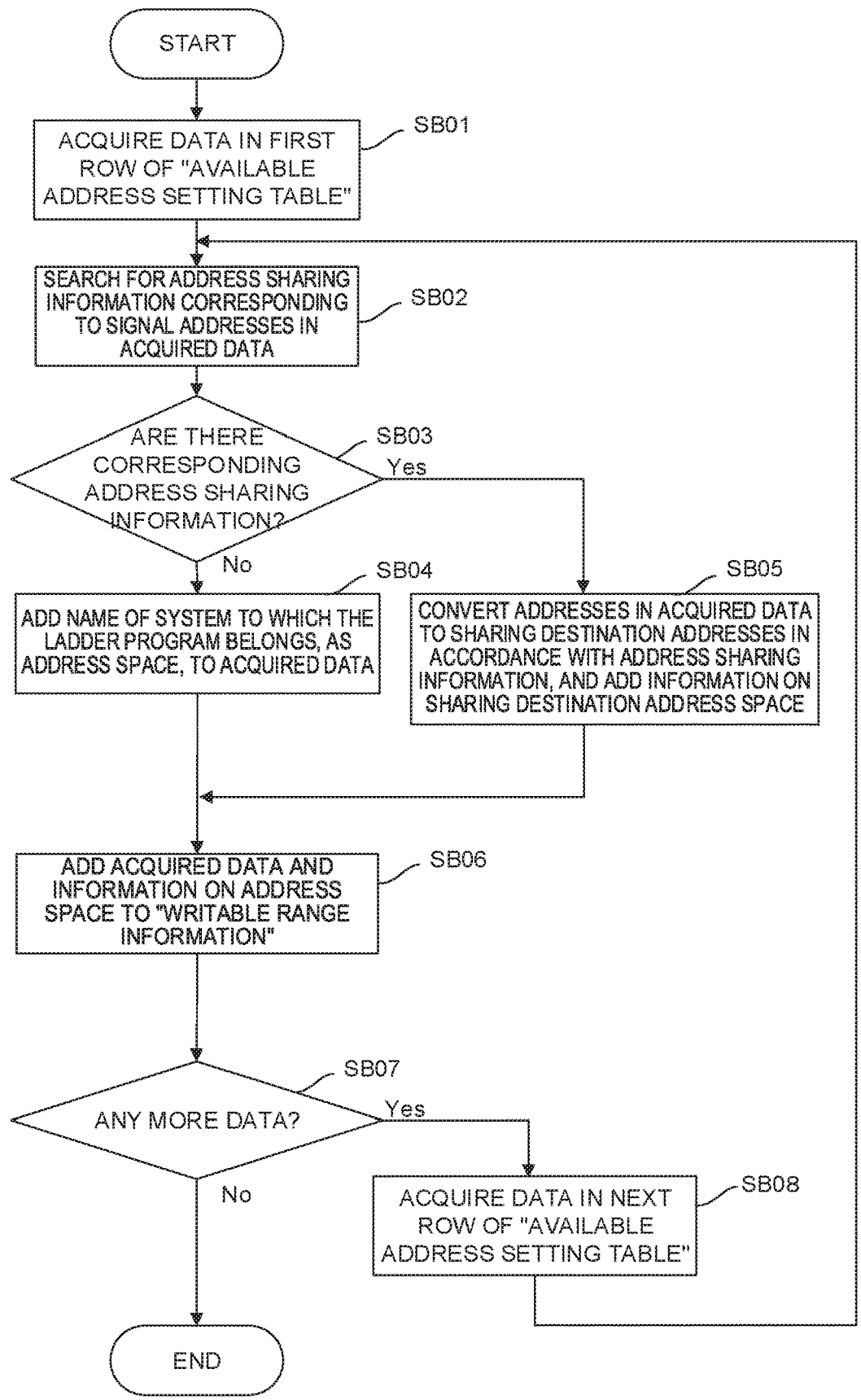
FIG. 7 is an overview flowchart of a process for creating writable range information by the programmable controller according to the one embodiment of the present invention.

FIG. 7 is an overview flowchart of a process (Step SA04 in FIG. 6) for creating writable range information by the programmable controller according to the one embodiment of the present invention.

[Step SB01] The programmable controller acquires data in the first row of the extracted "available address setting table".

[Step SB02] The programmable controller searches the address sharing information for signal addresses in the acquired data.

[Step SB03] The programmable controller determines whether signal addresses corresponding to signal addresses in the acquired data are contained in the address sharing information as a result of performing a search in Step SB02. If the signal addresses are not contained, the programmable controller goes to Step SB04; if the signal addresses are contained, the programmable controller goes to Step SB05.

[Step SB04] The programmable controller adds the name of the system to which the ladder program belongs, as a signal address space to which the ladder program accesses, to the acquired data.

[Step SB05] The programmable controller converts the signal addresses in the acquired data to a sharing destination address in accordance with the address sharing information, and adds information on a sharing destination address space to the acquired data.

[Step SB06] The programmable controller adds the acquired data and information on the signal address space to the "writable range information".

[Step SB07] The programmable controller determines whether there are any more data in the "available address setting table". If there are no more data, this processing is ended; if there are more data, the programmable controller goes to Step SB08.

[Step SB08] The programmable controller acquires data in the next row of the "available address setting table", and goes to Step SB02.

Figure 8:
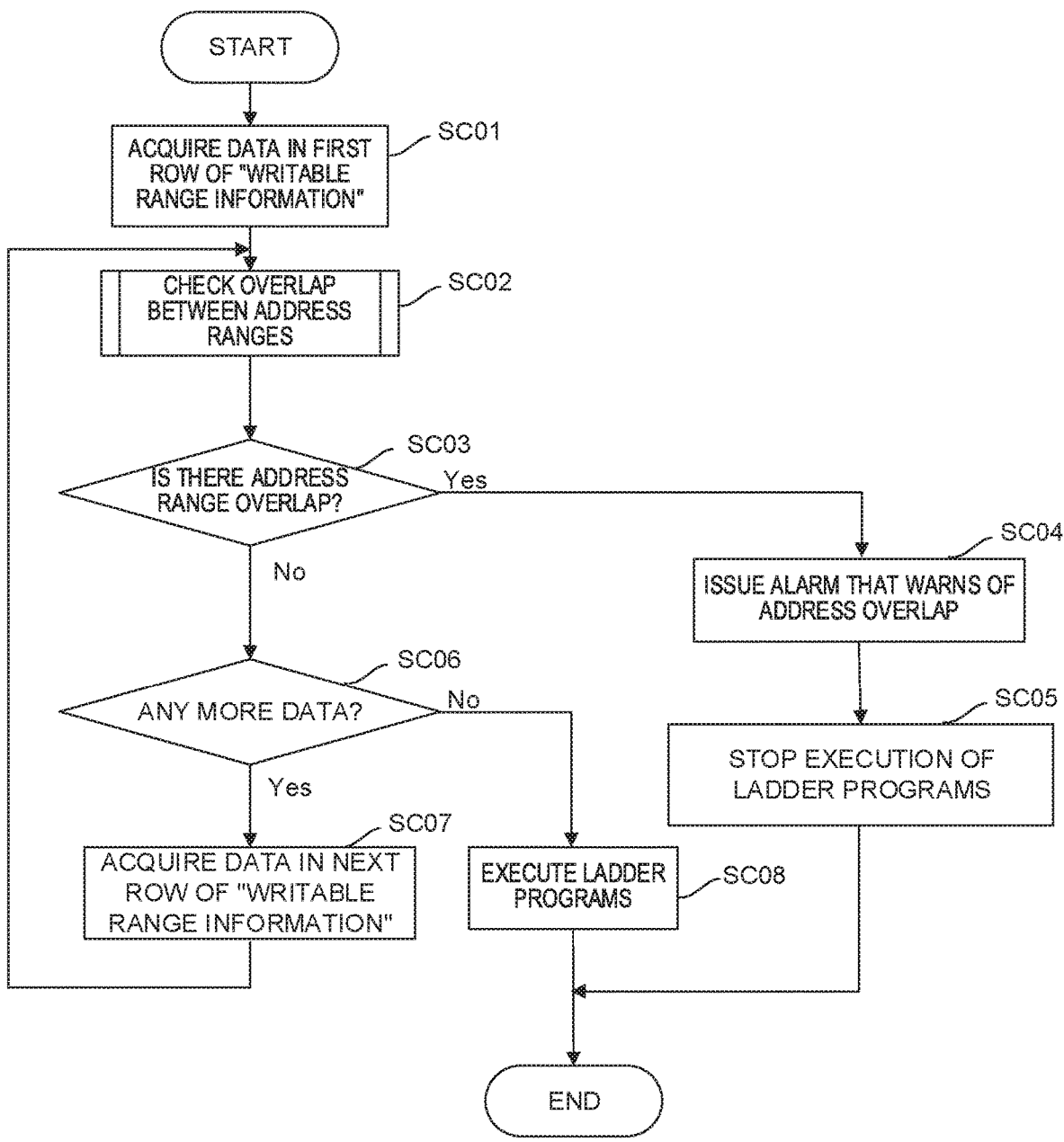
FIG. 8 is an overview flowchart of a process for checking writable range information by the programmable controller according to the one embodiment of the present invention.

FIG. 8 is an overview flowchart of a process (Step SA07 in FIG. 6) for checking the writable range information by the programmable controller according to the one embodiment of the present invention.

[Step SC01] The programmable controller acquires data in the first row of the "writable range information".

[Step SC02] The programmable controller executes a process for checking an overlap between address ranges using the acquired data as reference data.

[Step SC03] The programmable controller determines whether there is an address range overlap, as a result of executing the check in Step SC02. If there is an address range overlap, the programmable controller goes to Step SC04; if there is no address range overlap, the programmable controller goes to Step SC06.

[Step SC04] The programmable controller issues an alarm that warns of a signal address overlap. The alarm may be provided as display, sound, or a lamp. In the case where the alarm is provided as display, information on overlapping signal address spaces, signal address regions, and overlapping ladder programs is displayed on a display device that a control device has.

[Step SC05] The programmable controller stops the execution of the ladder programs, and ends this processing.

[Step SC06] The programmable controller determines whether there are any more data in the "writable range information". If there are more data, the programmable controller goes to Step SC07; if there are no more data, the programmable controller goes to Step SC08.

[Step SC07] The programmable controller acquires data in the next row of the "writable range information", and goes to Step SC02.

[Step SC08] The programmable controller starts the execution of the ladder programs, and ends this processing.

Figure 9:
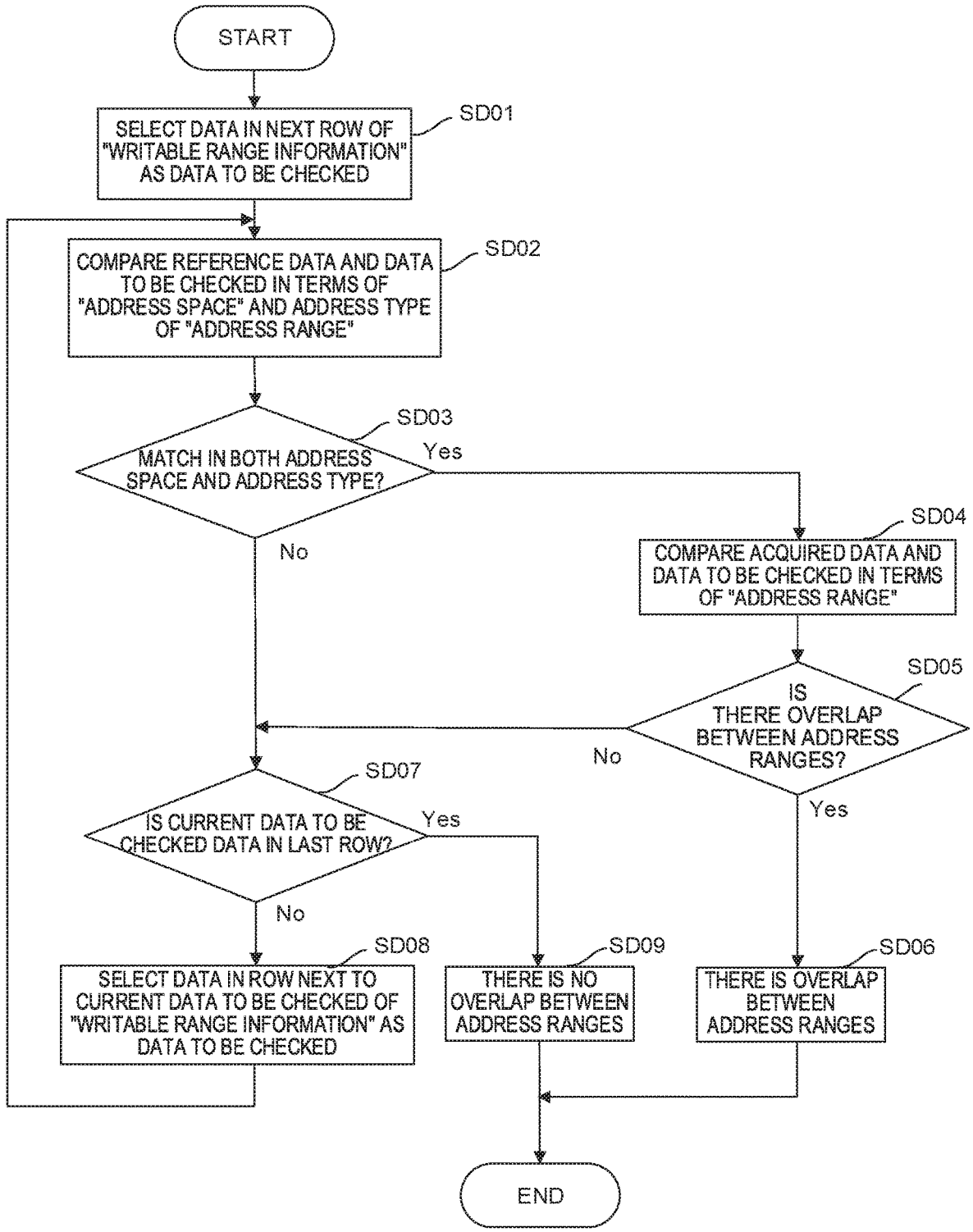
FIG. 9 is an overview flowchart of a process for checking an overlap between address ranges by the programmable controller according to the one embodiment of the present invention.

FIG. 9 is an overview flowchart of a process (Step SC02 in FIG. 8) for checking an overlap between address ranges by the programmable controller according to the one embodiment of the present invention.

[Step SD01] The programmable controller selects data in the row next to the reference data from the "writable range information" as data to be checked.

[Step SD02] The programmable controller compares the reference data and the data to be checked in terms of "address space" and the address type (address type expressed by the first character of the address; for example, the address type of "G1000" is "G", which indicates the interface address of CNC) of "address range".

[Step SD03] The programmable controller determines whether the comparison process in Step SD02 results in a match in both "address space" and the address type of "address range". If both "address space" and the address type of "address range" match, the programmable controller goes to Step SD04; if "address space" or the address type of "address range" or both do not match, the programmable controller goes to Step SD07.

[Step SD04] The programmable controller compares the reference data and the data to be checked in terms of "address range".

[Step SD05] The programmable controller determines whether the result of the comparison process in Step SD04 shows that there is an "address range" overlap. If there is an address range overlap, the programmable controller goes to Step SD06; if there is no address range overlap, the programmable controller goes to Step SD07.

[Step SD06] The programmable controller determines that there is an overlap between address ranges, and ends this processing.

[Step SD07] The programmable controller determines whether the current data to be checked is data in the last row of the "writable range information". If the current data to be checked are data in the last row, the programmable controller goes to Step SD09; if the current data to be checked are not data in the last row, the programmable controller goes to Step SD08.

[Step SD08] The programmable controller selects data in the row next to the current data to be checked of the "writable range information" as data to be checked, and goes to Step SD02.

[Step SD09] The programmable controller determines that there is no overlap between address ranges, and ends this processing.

A configuration of the programmable controller according to the one embodiment of the present invention for realizing the above-described operation will be described below.

Figure 10:
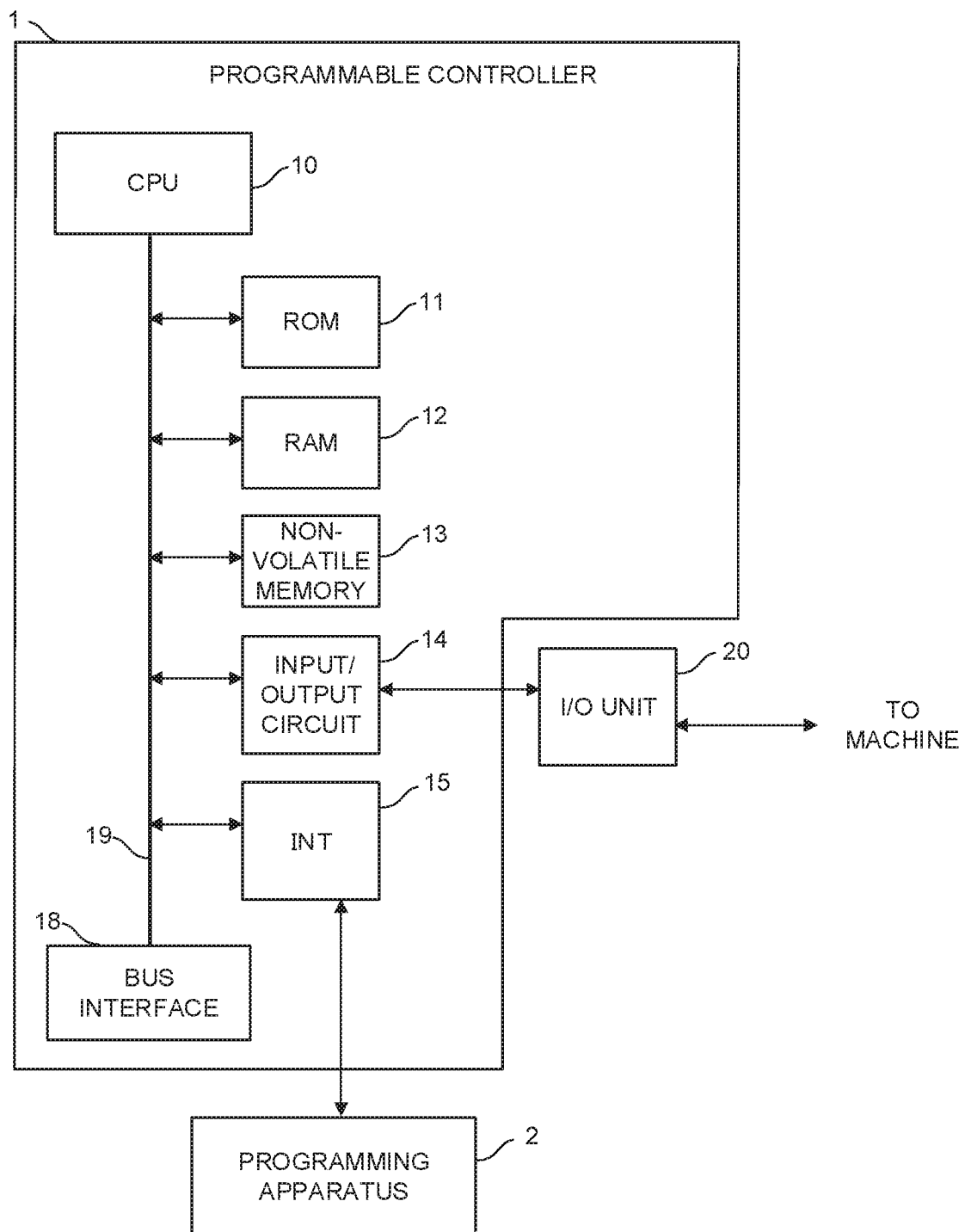
FIG. 10 is a schematic diagram of the hardware configuration of the programmable controller according to the one embodiment of the present invention.

FIG. 10 is a schematic diagram of the hardware configuration of the programmable controller according to the one embodiment of the present invention. A programmable controller 1 includes a CPU 10 configured to execute sequence control. A ROM 11, a RAM 12, a non-volatile memory 13, an input/output circuit 14, and an interface 15 are connected to the CPU 10 through a bus 19. A programming apparatus 2 is connected to the interface 15. This configuration allows the programmable controller 1 to acquire through the interface 15 a ladder program created and edited on the programming apparatus 2 and compiled into an executable object and to record the executable object on the non-volatile memory 13. A control device such as a numerical controller can be connected to the bus 19 through a bus interface 18. Various kinds of actuators, sensors, and the like of machines to be controlled such as a machine tool and a peripheral are connected to the input/output circuit 14 through an I/O unit 20.

The ROM 11 stores a system program for the CPU 10 of the programmable controller 1. The CPU 10 controls the operation of various sections of the programmable controller 1 by executing the system program. The non-volatile memory 13 stores ladder programs that are executed by the programmable controller 1. When ladder programs are executed, the CPU 10 reads the ladder programs from the non-volatile memory 13, stores the ladder programs in an execution ladder program storage area of the RAM 12, and sequentially executes the execution ladder programs stored on the RAM 12.

The RAM 12 has an execution signal memory area for storing various signals that are used when the programmable controller 1 executes the ladder programs. The execution signal memory area includes areas for storing input signals necessary for executing the ladder programs, output signals, the states of internal relays in the ladder programs, and the like.

Figure 11:
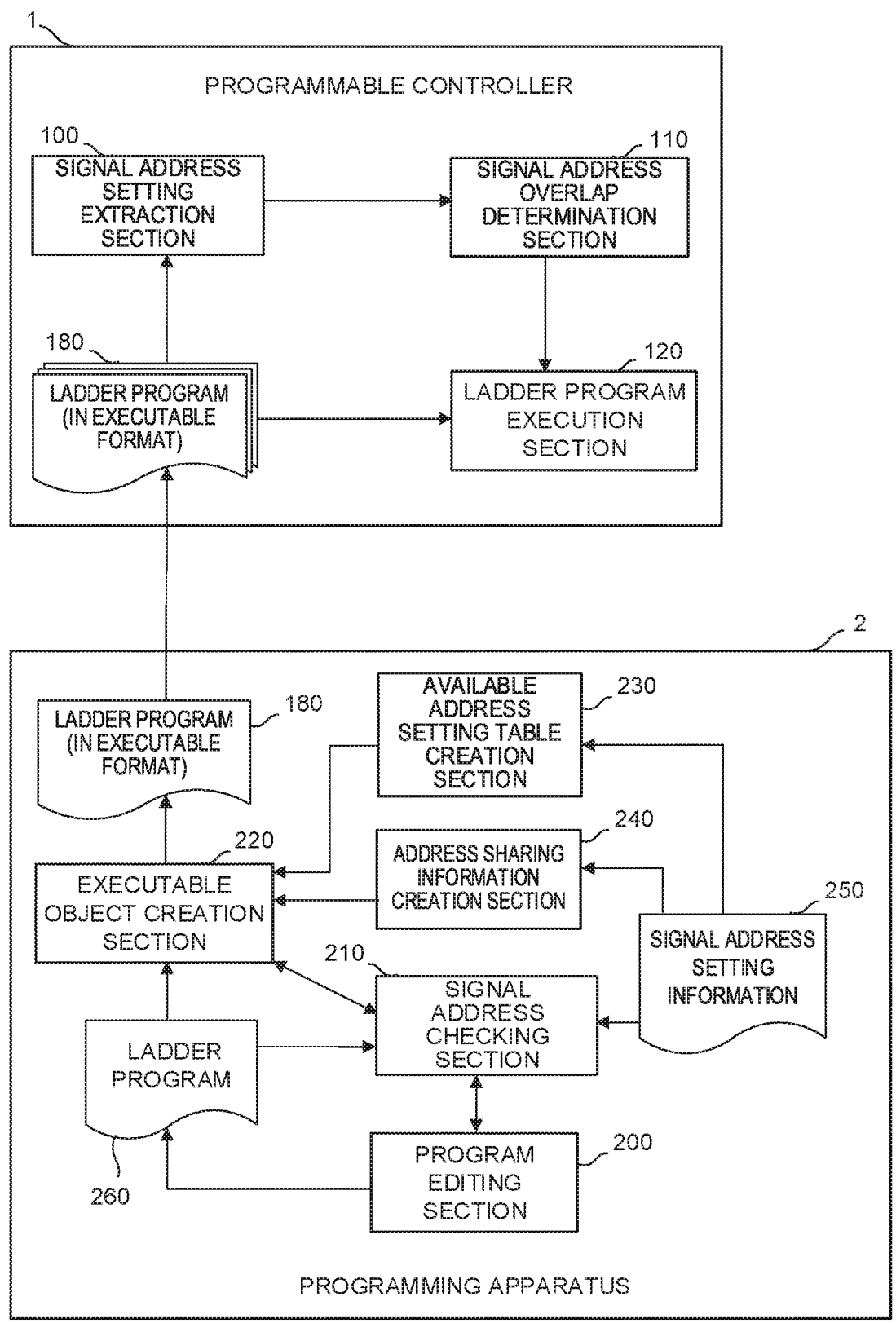
FIG. 11 is a schematic functional block diagram of the programmable controller according to the one embodiment of the present invention and a programming apparatus.

FIG. 11 is a schematic functional block diagram illustrating the programmable controller according to the one embodiment of the present invention and a programming apparatus relating to the programmable controller. Functional blocks shown in FIG. 11 are realized by the CPU 10 of the programmable controller 1 shown in FIG. 10 executing the system program to control the operation of various sections of the programmable controller 1. The programmable controller 1 of this embodiment includes a signal address setting extraction section 100, a signal address overlap determination section 110, and a ladder program execution section 120.

The signal address setting extraction section 100 extracts available address setting tables and address sharing information from executable ladder programs 180 which is to be executed and is stored in the non-volatile memory 13.

Based on the available address setting tables and the address sharing information extracted by the signal address setting extraction section 100, the signal address overlap determination section 110 determines whether there is an overlap between addresses in writable ranges of the ladder programs 180, and outputs the determination result to the ladder program execution section 120.

If the signal address overlap determination section 110 determines that there is no overlap between addresses in the writable ranges of the ladder programs 180, the ladder program execution section 120 executes the ladder programs 180. On the other hand, if it is determined that there is an overlap between addresses, the ladder program execution section 120 stops the execution of the ladder programs 180, and outputs information on the ladder programs 180 including overlapping addresses in writable ranges and an alarm through the bus interface 18 or the like.

The programming apparatus 2 is an apparatus that shares the executable ladder programs 180 with the programmable controller 1, and is configured by installing system software for editing and compiling ladder programs in a numerical controller, a personal computer, or the like. The supply of the executable ladder programs 180 from the programming apparatus 2 to the programmable controller 1 is performed through the interface 15 of the programmable controller 1. The programming apparatus 2 includes a program editing section 200, a signal address checking section 210, an executable object creation section 220, an available address setting table creation section 230, and an address sharing information creation section 240.

The program editing section 200 is functional means for accepting actions by the operator to create and edit the ladder programs 260. The program editing section 200 may be configured to graphically display the ladder programs 260 on a screen such that a relay circuit arrangement action, a connecting action, and the like can be performed on the ladder program 260. The program editing section 200 stores the ladder programs 260 created and edited by actions by the operator on an unillustrated memory of the programming apparatus 2. Every time the program editing section 200 receives an editing action from an operator, the program editing section 200 may instruct the signal address checking section 210 to check signal addresses with regard to contents of editing by the editing action. In that case, if contents of editing by the editing action include writing to signal addresses that contradicts signal address setting information 250, the program editing section 200 may display an error message with respect to the editing action and reject the editing action.

Based on an instruction from the program editing section 200 or the executable object creation section 220, the signal address checking section 210 refers to information on writable ranges relating to the ladder programs 260 in the signal address setting information 250 set in advance and stored on the unillustrated memory of the programming apparatus 2, and determines whether or not signal addresses defined as writable addresses in the ladder programs 260 contradict information on writable range defined in the signal address setting information 250 (whether or not writing is performed to signal addresses outside the writable range defined in the signal address setting information 250 in the ladder program 260). If the signal address checking section 210 determines that signal addresses defined as writable addresses in the ladder programs 260 contradict information on writable ranges defined in the signal address setting information 250, the signal address checking section 210 notifies the program editing section 200 of that effect, and instructs the program editing section 200 to display a portion corresponding to writing to the contradicting signal address in such a manner that the operator can understand.

The executable object creation section 220 compiles the ladder programs 260 created and edited by the program editing section 200 to create the executable ladder programs 180. To create the executable ladder programs 180, the executable object creation section 220 embeds the available address setting tables created by the available address setting table creation section 230 based on the signal address setting information 250 and address sharing information created by the address sharing information creation section 240 based on the signal address setting information 250 in the executable ladder programs 180. The executable object creation section 220 may embed the available address setting tables and the address sharing information in the form of a header, a comment, or the like, which does not directly affect the execution of the ladder programs 180. Before the execution of compiling, the executable object creation section 220 may instruct the signal address checking section 210 to check signal addresses of the ladder programs 260.

Next, an example of specific operation of the programmable controller 1 according to the one embodiment of the present invention and the programming apparatus 2 will be described with reference to FIGS. 12 and 13. In this example, a machine is controlled using two divided ladders (shared address space), which correspond to, for example, machine's basic functions and tool management functions.

Figure 12:
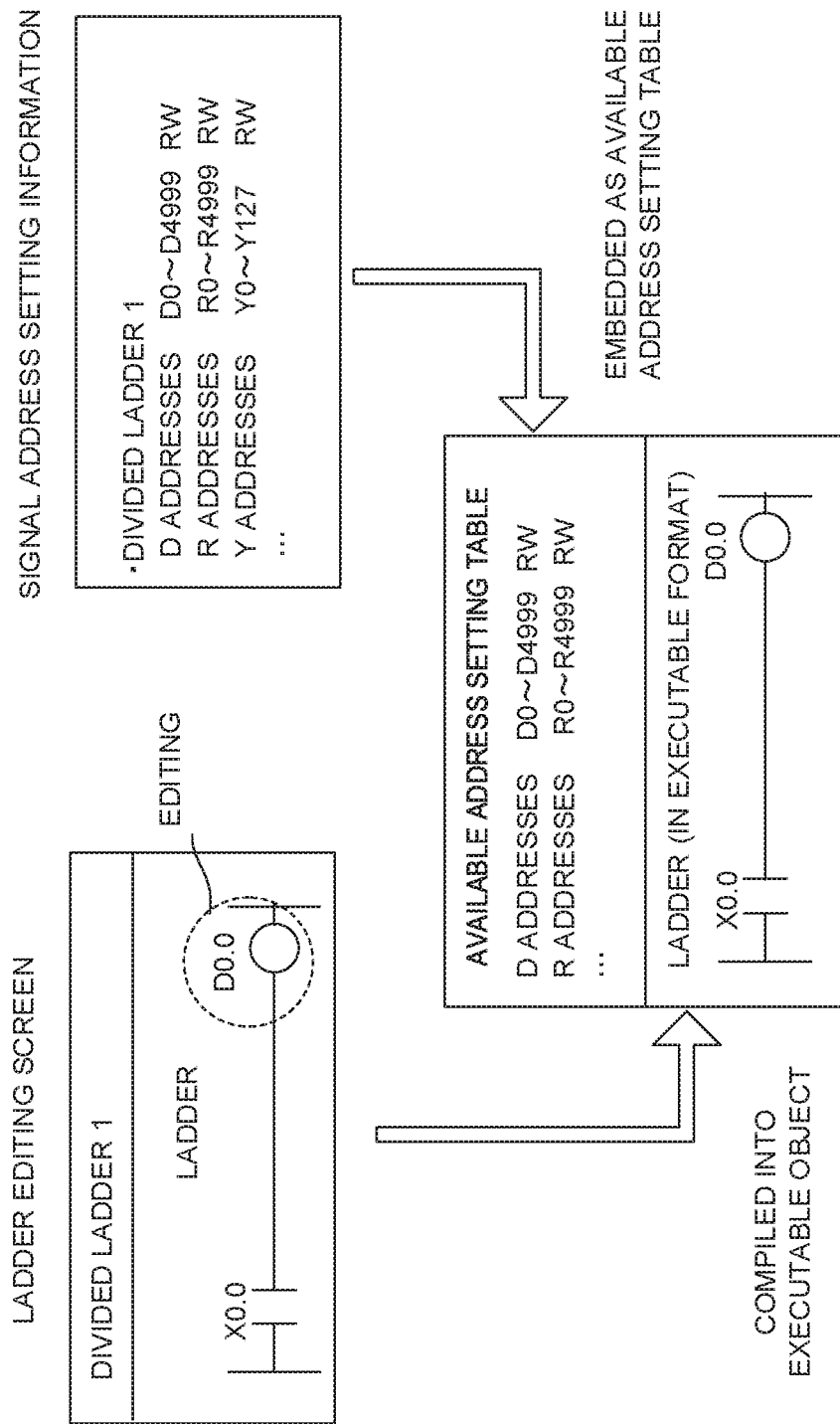
FIG. 12 is a view showing operation including the creation, editing, and compiling of a ladder program in the programmable controller according to the one embodiment of the present invention.

FIG. 12 shows operation including the creation, editing, and compiling a ladder program. An operator manipulates the programming apparatus 2 to create signal address setting information on divided ladder 1 and divided ladder 2 in advance, and then starts the creation and editing of divided ladder 1 and divided ladder 2. The operator creates and edits divided ladder 1 and divided ladder 2 while looking at a screen provided by the program editing section 200. The program editing section 200 may instruct, upon receiving an editing action from the operator, the signal address checking section 210 to check contents of editing by the editing action. For example, in the case where an editing action for changing signal address D0.0 to signal address D100.0 is performed on divided ladder 1 in the example in FIG. 12, the signal address is within the writable address range defined in the signal address setting information and therefore determined to constitute no contradiction, and the program editing section 200 accepts the editing action. It should be noted that, for example, in the case where an editing action is performed so that writing to signal address D5000.0 may be performed, the signal address is outside the writable address range defined in the signal address setting information and constitutes a contradiction, and therefore the program editing section 200 does not accept the editing action.

When the operator finishes the creation and editing of divided ladder 1 and divided ladder 2, the operator then instructs the executable object creation section 220 to compile divided ladder 1 and divided ladder 2 into executable objects. To compile divided ladder 1 and divided ladder 2, the executable object creation section 220 retrieves information on the respective writable ranges relating to divided ladder 1 and divided ladder 2 from the signal address setting information to create available address setting tables, and embeds the respective available address setting tables in the executable objects.

Figure 13:
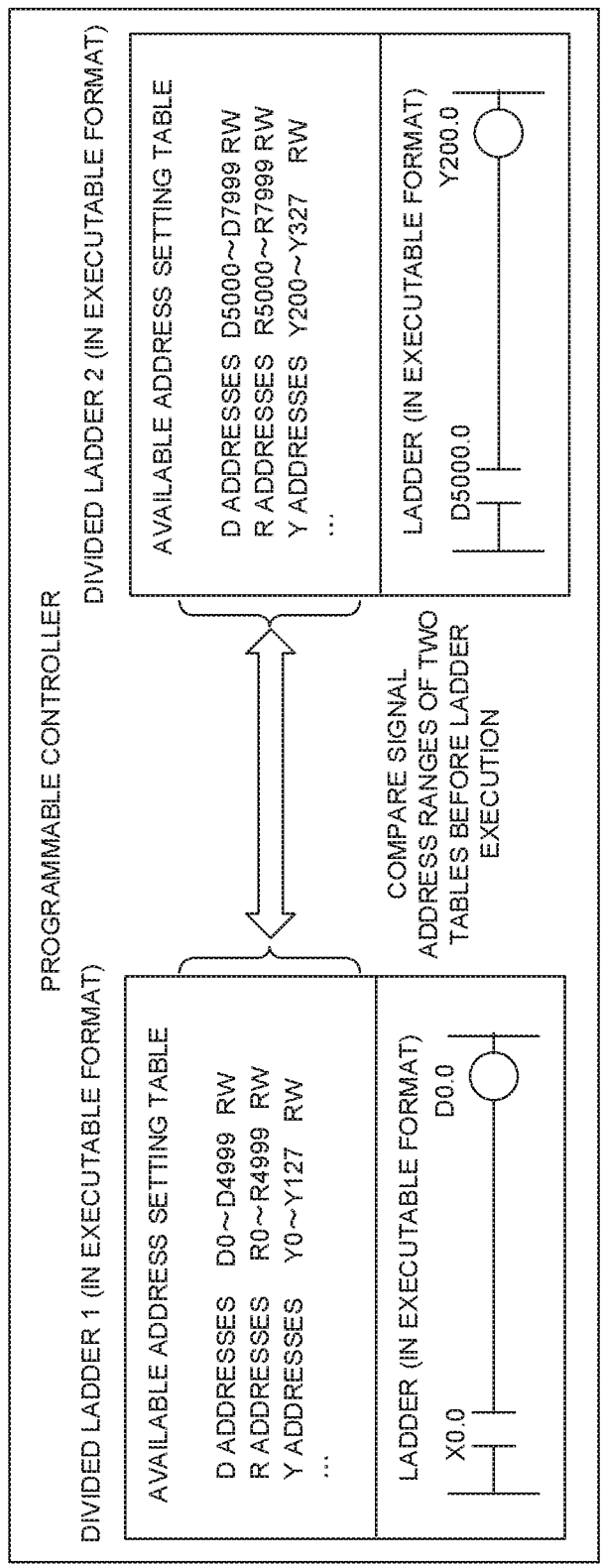
FIG. 13 is a view showing operation performed by the programmable controller according to the one embodiment of the present invention when divided ladder 1 and divided ladder 2, which are executable ladder programs, are executed on the programmable controller.

FIG. 13 shows operation performed when divided ladder 1 and divided ladder 2, which are executable ladder programs, are executed on the programmable controller 1. The operator transfers the executable ladder programs (divided ladder 1 and divided ladder 2) created on the programming apparatus 2 to the programmable controller 1, and instructs the programmable controller 1 to execute the executable ladder programs (divided ladder 1 and divided ladder 2). In the programmable controller 1, the signal address setting extraction section 100 extracts an available address setting table from each of the ladder programs before the execution of divided ladder 1 and divided ladder 2, and the signal address overlap determination section 110 checks whether or not there is an overlap between write destination signal address ranges of divided ladder 1 and divided ladder 2 based on the extracted available address setting tables. In the example in FIG. 13, write destination signal addresses defined in one of the available address setting tables do not overlap write destination signal addresses defined in the other. In response to the determination result, the ladder program execution section 120 starts the execution of divided ladder 1 and divided ladder 2. It should be noted that, for example, in the case where "D4000-7999" is defined as a write destination in the available address setting table of divided ladder 2 in FIG. 13, the signal address overlap determination section 110 determines that write destination signal addresses of divided ladder 1 overlap write destination signal addresses of divided ladder 2, and the ladder program execution section 120 stops the execution of divided ladder 1 and divided ladder 2 in response to the determination.

Next, an example of specific operation of the programmable controller 1 according to the one embodiment of the present invention and the programming apparatus 2 will be described with reference to FIGS. 14 to 16. In this example, control is performed by executing ladder programs on two programmable controllers (independent address spaces), which correspond to a main body of a machine and a peripheral.

Figure 14:
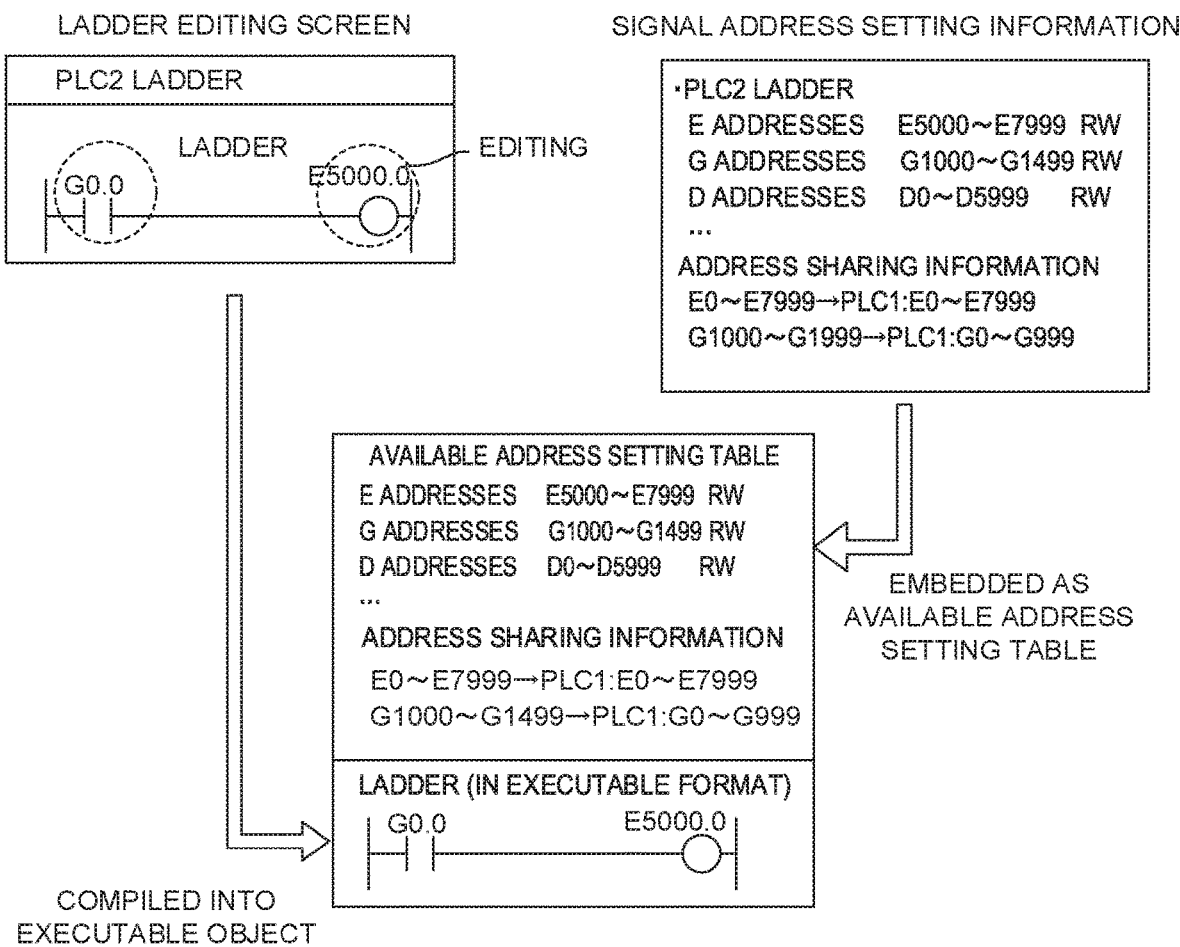
FIG. 14 is a view showing operation including the creation, editing, and compiling of a ladder program in the programmable controller according to the one embodiment of the present invention.

FIG. 14 shows operation including the creation, editing, and compiling of a ladder program. The operator manipulates the programming apparatus 2 to create signal address setting information on PLC1 ladder and PLC2 ladder in advance, and then starts the creation and editing of PLC1 ladder and PLC2 ladder. The operator creates and edits PLC1 ladder and PLC2 ladder while looking at a screen provided by the program editing section 200. The program editing section 200 may instruct, upon receiving an editing action from the operator, the signal address checking section 210 to check contents of editing by the editing action. For example, in the case where an editing action for changing signal address E5000.0 to signal address E6000.0 is performed on PLC2 ladder in the example in FIG. 14, the signal address is within the writable address range defined in the signal address setting information and therefore determined to constitute no contradiction, and the program editing section 200 accepts the editing action. It should be noted that, for example, in the case where an editing action is performed so that signal address G0.0 of PLC2 ladder may be a write destination address in the example in FIG. 14, the signal address is outside the writable address range defined in the signal address setting information and constitutes a contradiction, and therefore the program editing section 200 does not accept the editing action.

When the operator finishes the creation and editing of PLC1 ladder and PLC2 ladder, the operator then instructs the executable object creation section 220 to compile PLC1 ladder and PLC2 ladder into executable objects. To compile PLC1 ladder and PLC2 ladder, the executable object creation section 220 retrieves information on the respective writable ranges relating to each of the ladder programs from the signal address setting information to create available address setting tables, embeds the respective available address setting tables in the executable objects, and embeds the respective sets of address sharing information relating to each of the ladder programs in the executable objects.

Figure 15:
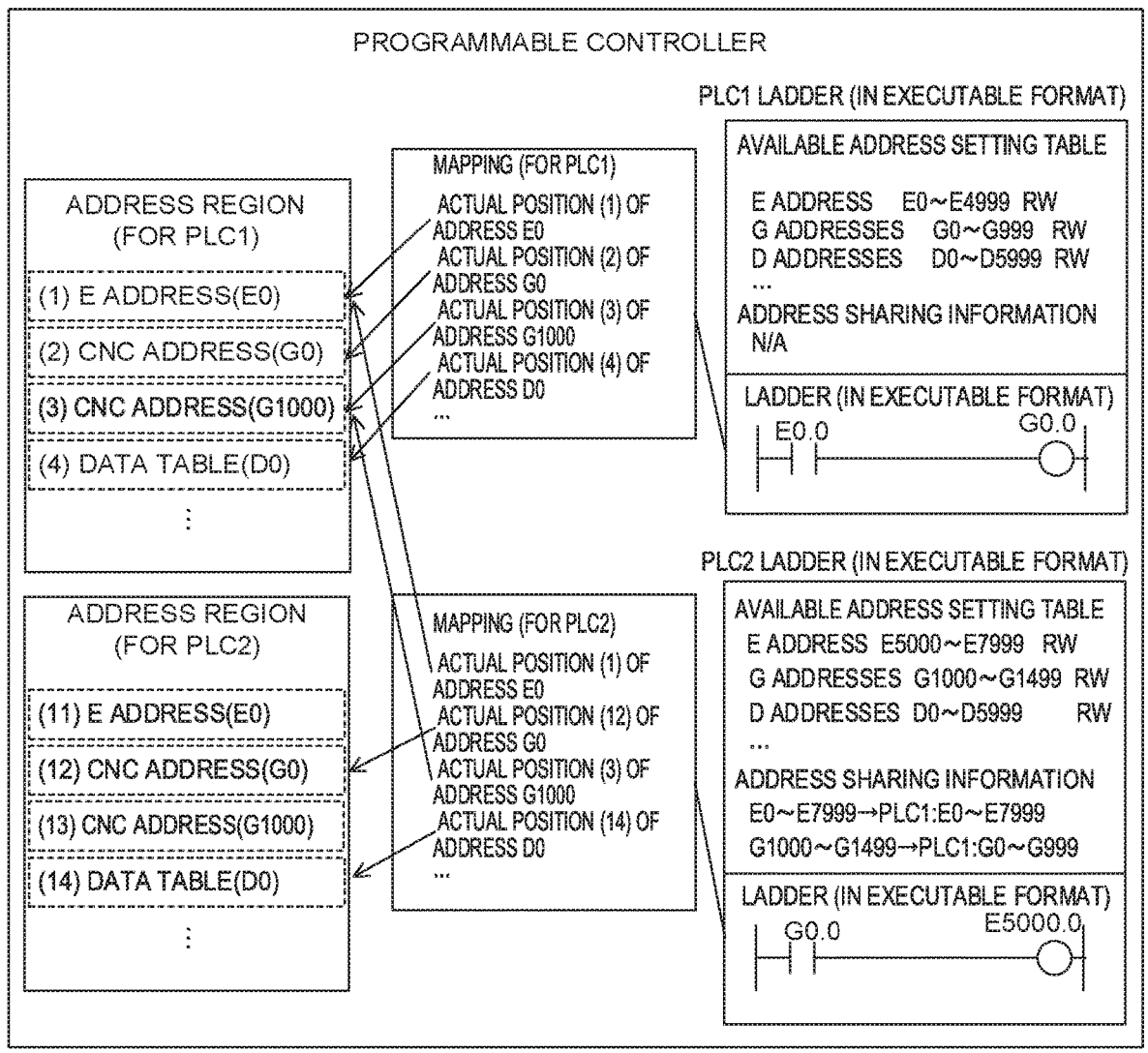
FIG. 15 is a view showing operation for mapping signal addresses performed when PLC1 ladder and PLC2 ladder, which are executable ladder programs, are executed on the programmable controller according to the one embodiment of the present invention.

FIG. 15 shows the mapping of signal addresses performed when PLC1 ladder and PLC2 ladder, which are executable ladder programs, are executed on the programmable controller 1. When a plurality of ladders (PLC1 ladder and PLC2 ladder) are executed on the programmable controller 1, mapping information (virtual address-to-physical address conversion) for each ladder program is created based on address sharing information in the ladder program. When the programmable controller 1 refers to address regions specified by each ladder program, the programmable controller 1 refers to address regions converted in accordance with the mapping information. In the example in FIG. 15, PLC2 ladder refers to E addresses and G addresses for PLC1 when referring to E addresses and G addresses.

Figure 16:
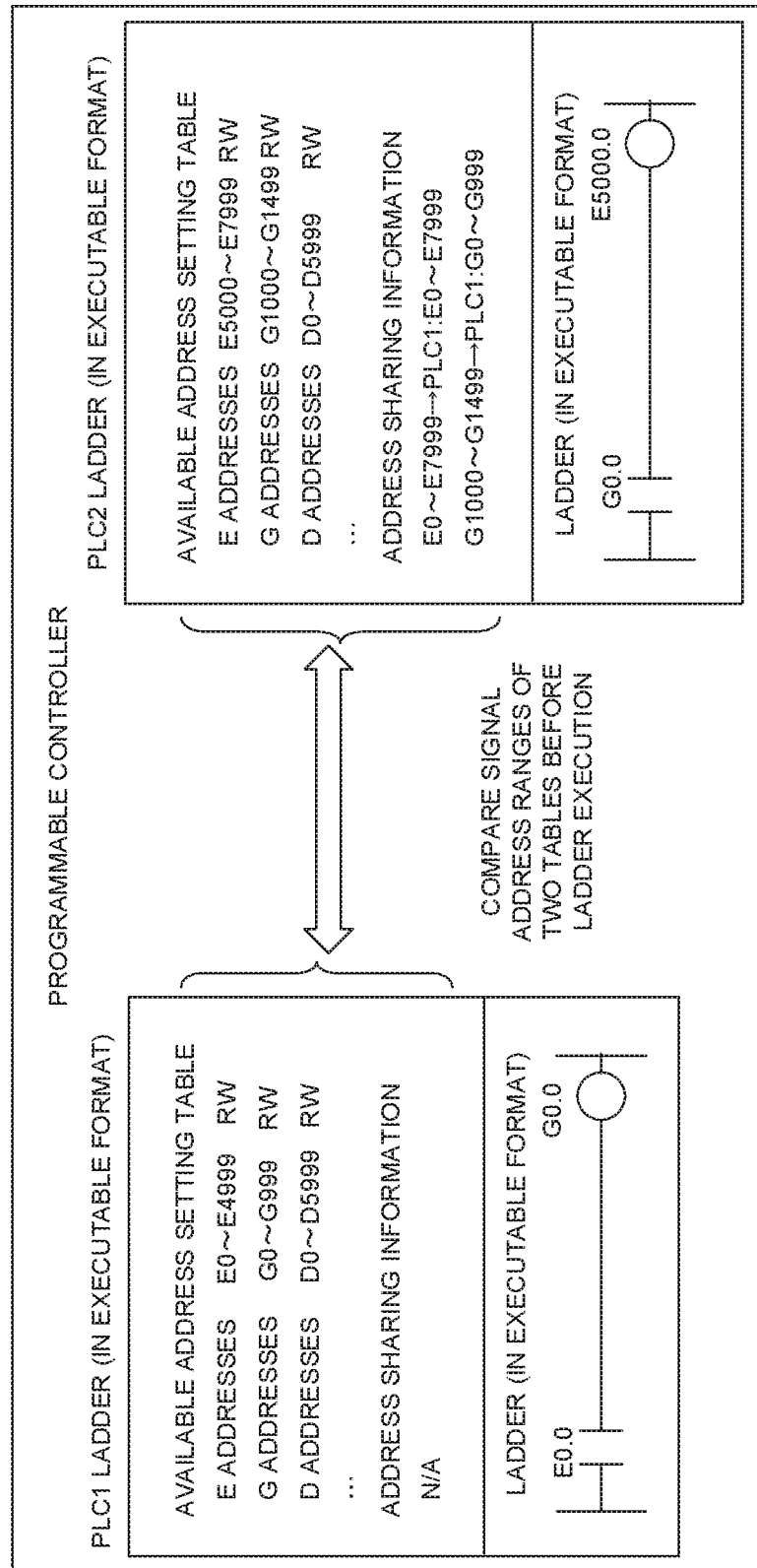
FIG. 16 is a view showing operation performed by the programmable controller according to the one embodiment of the present invention when PLC1 ladder and PLC2 ladder, which are executable ladder programs, are executed.
Figure 17:
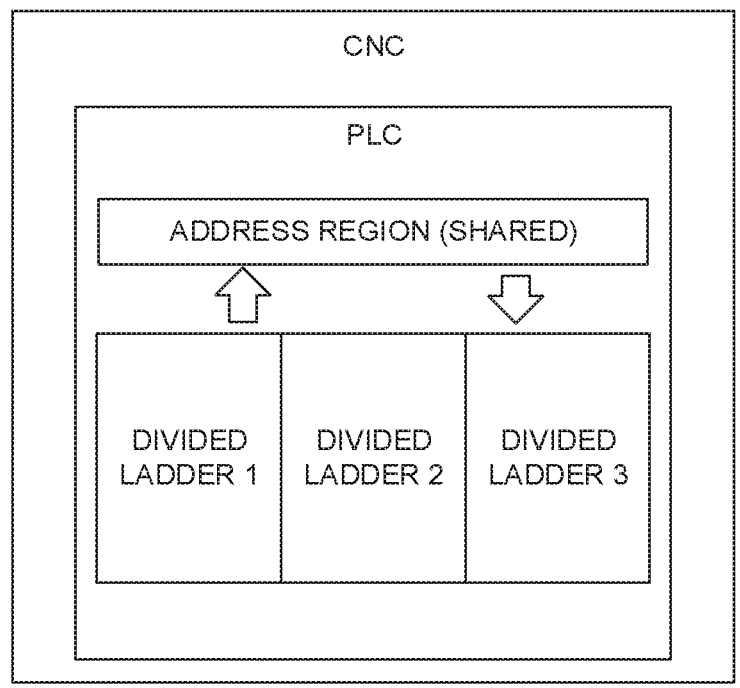
FIG. 17 is a view illustrating a divided-ladder configuration of a programmable controller according to a prior art technique.
Figure 18:
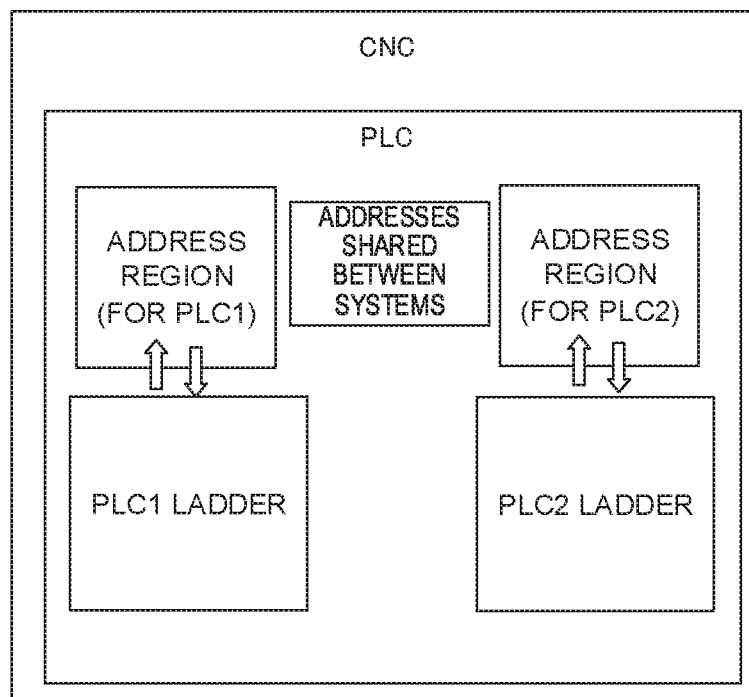
FIG. 18 is a view illustrating a multisystem programmable controller configuration of a programmable controller according to a prior art technique.
Figure 19:
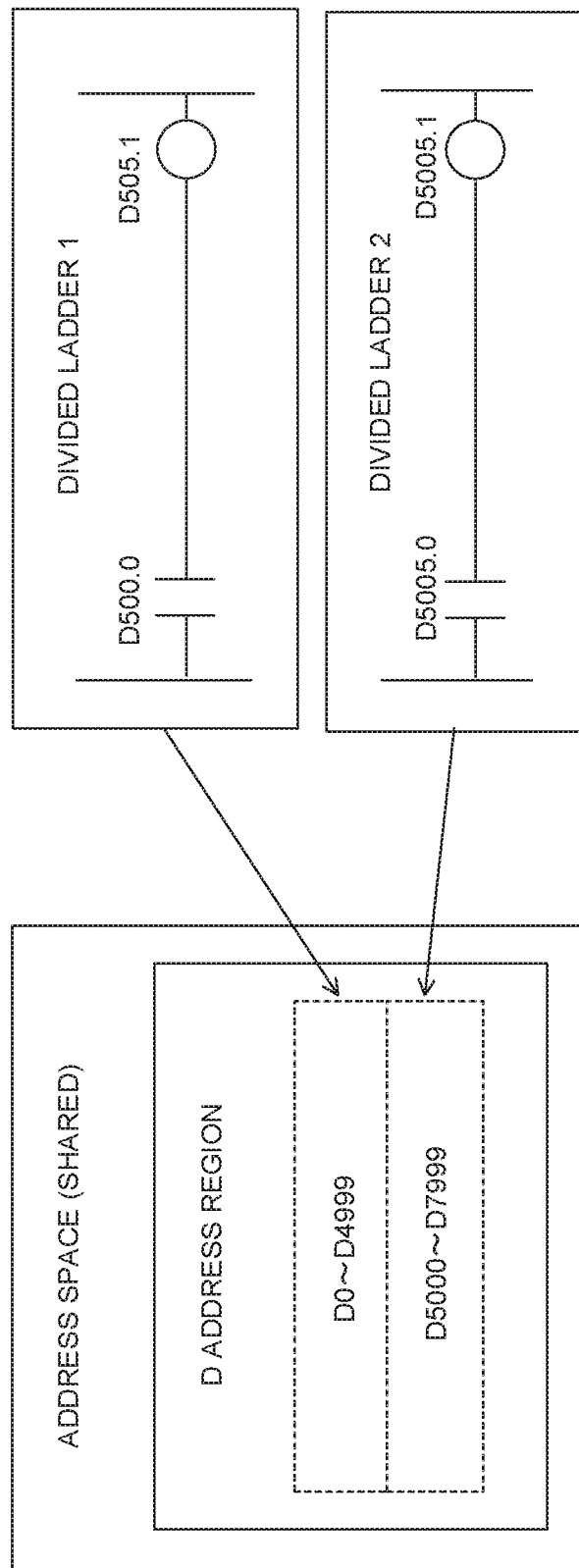
FIG. 19 is a view illustrating a method for creating and editing a ladder program in a divided-ladder configuration according to a prior art technique.
Figure 20:
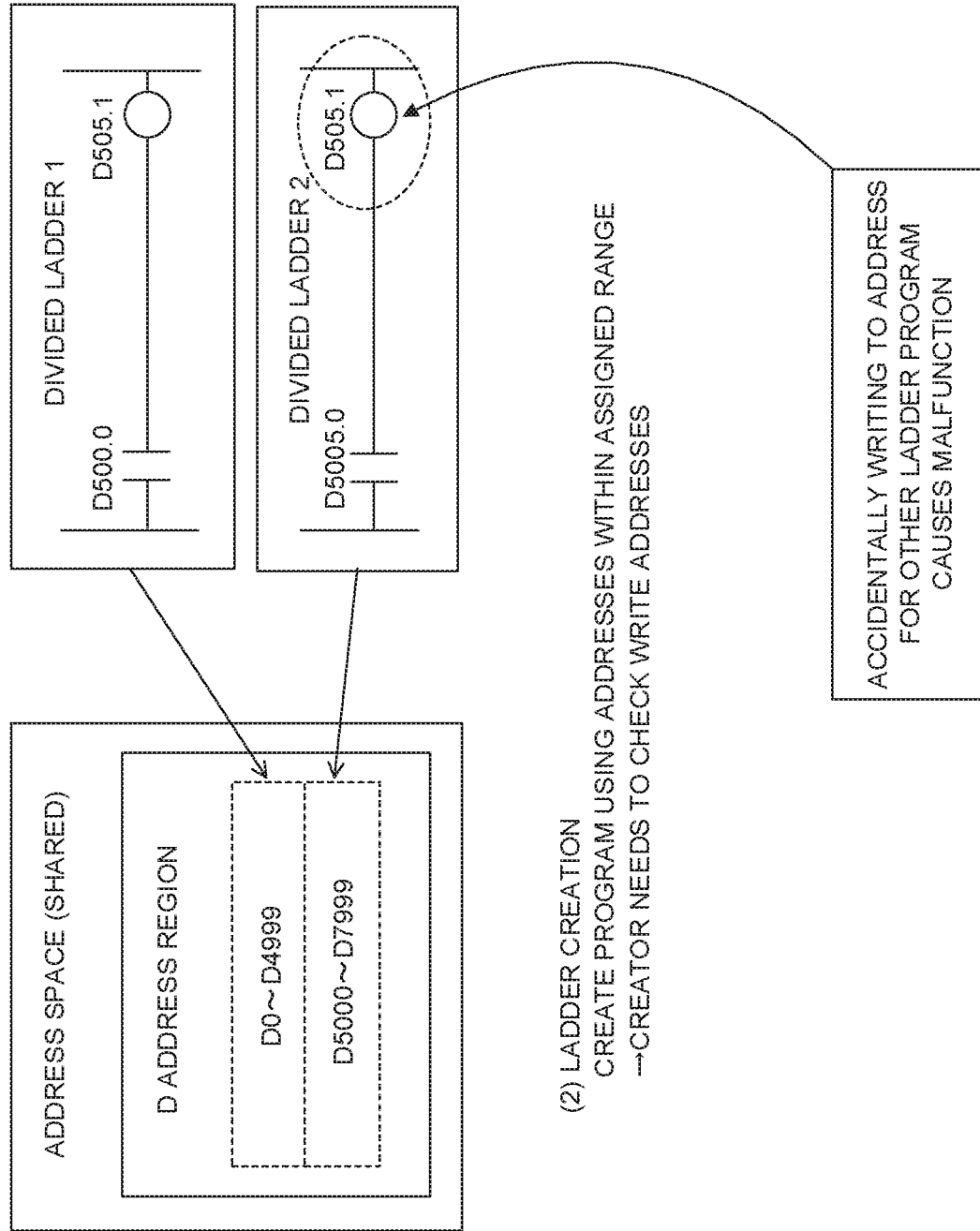
FIG. 20 is a view illustrating a problem of a method for creating and editing a ladder program in a divided-ladder configuration according to a prior art technique.
Figure 21:
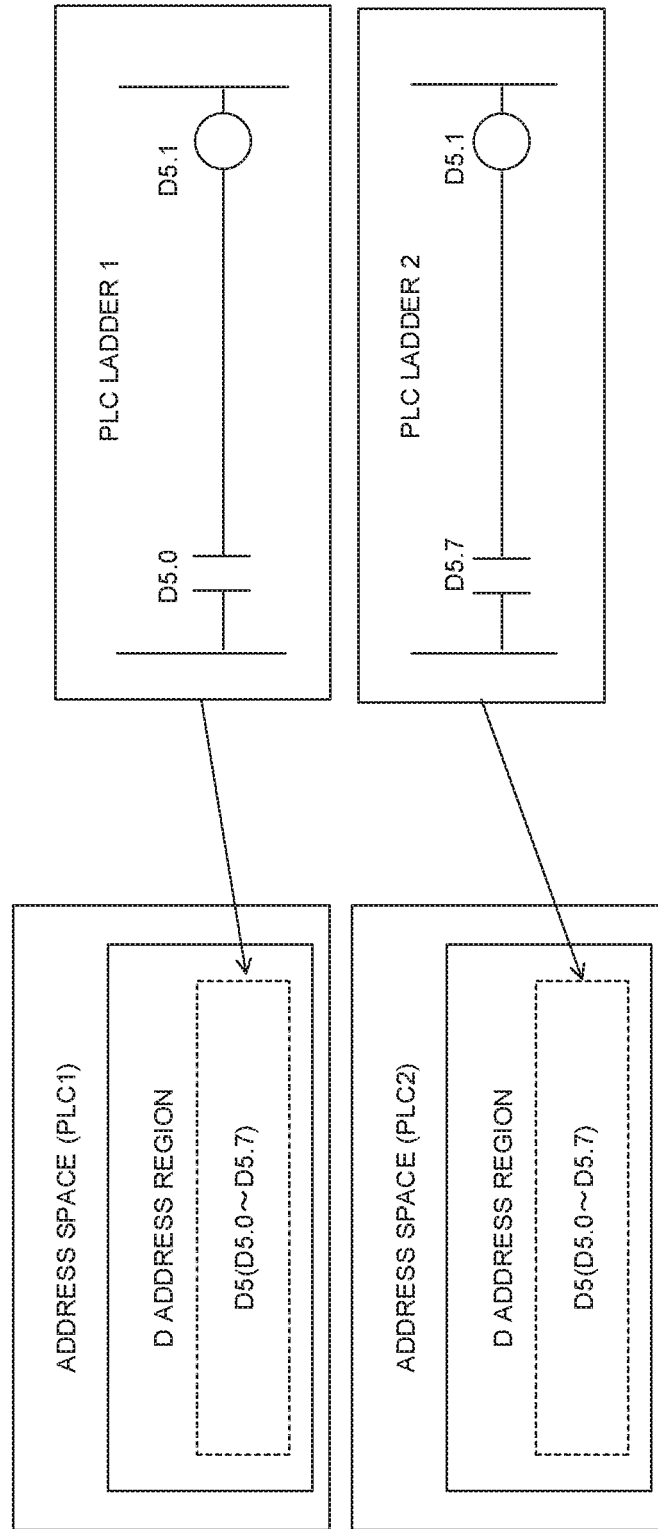
FIG. 21 is a view illustrating a method for executing a ladder program in a multisystem programmable controller configuration according to a prior art technique.
Figure 22:
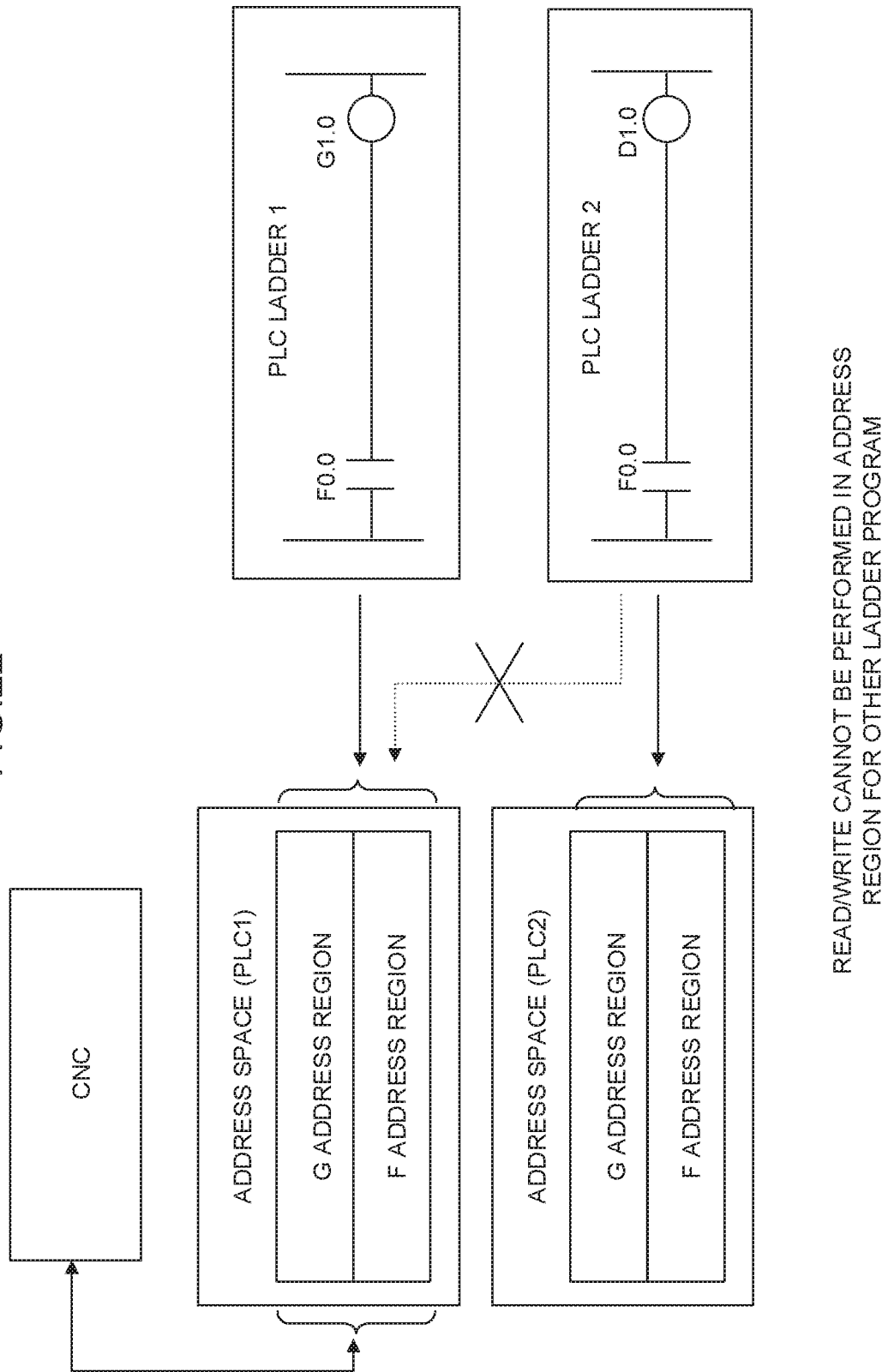
FIG. 22 is a view illustrating a problem of a method for executing a ladder program in a multisystem programmable controller configuration according to a prior art technique.
Figure 23:
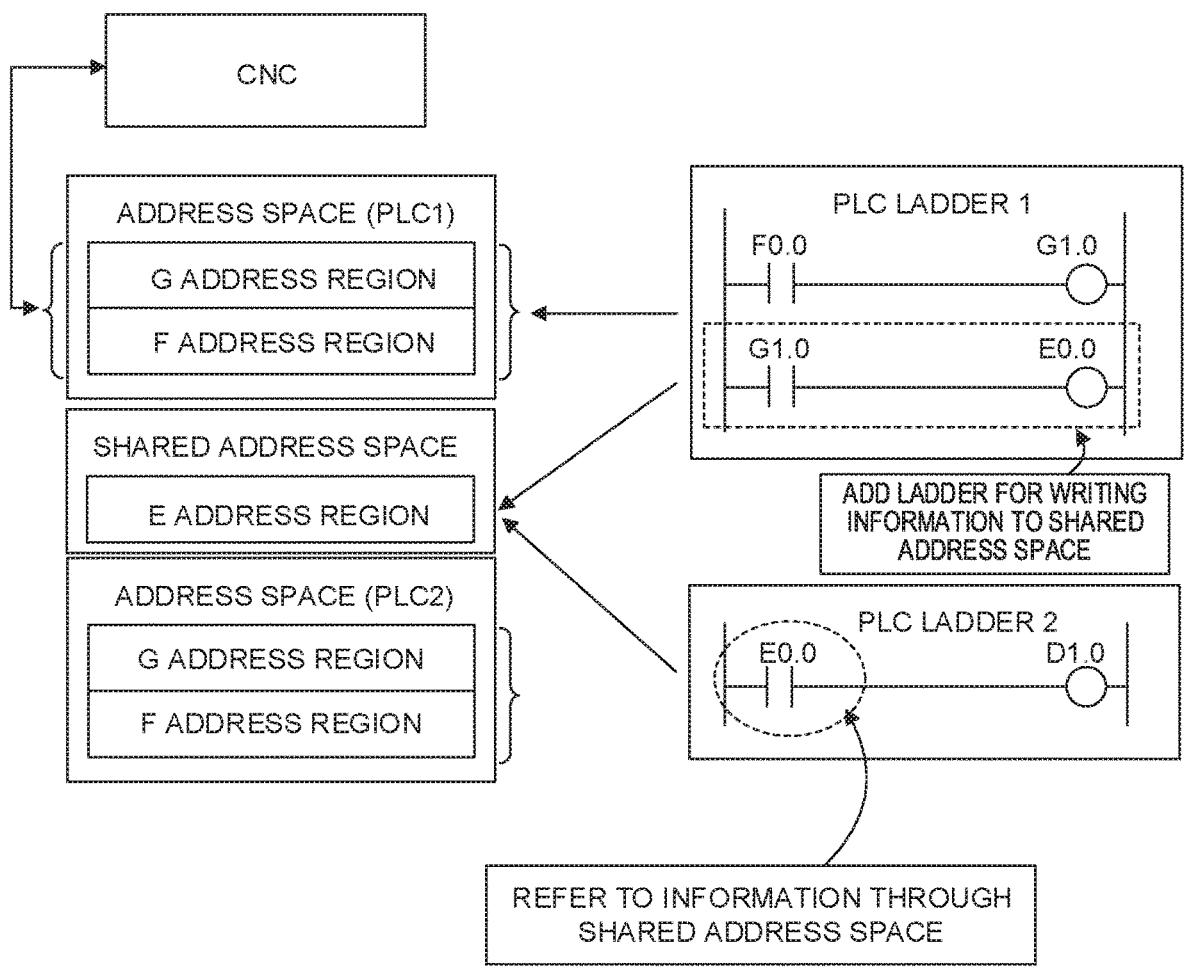
FIG. 23 is a view illustrating an improved method for executing a ladder program in a multisystem programmable controller configuration according to a prior art technique.

FIG. 16 shows operation performed when PLC1 ladder and PLC2 ladder, which are executable ladder programs, are executed on the programmable controller 1. The operator transfers the executable ladder programs (PLC1 ladder and PLC2 ladder) created on the programming apparatus 2 to the programmable controller 1, and instructs the programmable controller 1 to execute the executable ladder programs (PLC1 ladder and PLC2 ladder). In the programmable controller 1, the signal address setting extraction section 100 extracts an available address setting table and address sharing information from each of ladder programs before the execution of PLC1 ladder and PLC2 ladder, and the signal address overlap determination section 110 checks whether or not there is an overlap between write destination signal address ranges of PLC1 ladder and PLC2 ladder based on the extracted available address setting tables. In the example in FIG. 16, signal addresses G1000 to G1499, which PLC2 ladder accesses, are mapped to signal address region G0 to G999 for PLC1, and therefore write destination signal addresses of PLC1 ladder and PLC2 ladder are determined to overlap each other. The ladder program execution section 120 stops the execution of PLC1 ladder and PLC2 ladder in response to the determination result.

While embodiments of the present invention have been described above, the present invention is not limited to only the above-described exemplary embodiments, but can be carried out in various aspects by making appropriate modifications thereto.

For example, in the above-described embodiment, both of a function to edit a ladder program and a function to compile a ladder program are implemented in the programming apparatus 2. However, these two functions do not need to be implemented in the same apparatus, and may be implemented in two different apparatuses.

While embodiments of the present invention have been described, the present invention is not limited to the above-described exemplary embodiments, but can be carried out in other aspects by making appropriate modifications thereto.

The invention claimed is:

1. A programmable controller configured to execute a plurality of ladder programs, the programmable controller comprising:
   a processor configured to
      extract an available address setting table embedded in each of the plurality of ladder programs, the available address setting table defining a range of consecutive signal addresses used as signal write destinations by the respective ladder program,
      determine whether there is an overlap between the respective ranges of consecutive signal addresses used as the signal write destinations by the plurality of ladder programs, based on the available address setting tables,
      execute the plurality of ladder programs in response to determining that there is no overlap between the respective ranges of consecutive signal addresses used as the signal write destinations by the plurality of ladder programs, and
      in response to determining that there is overlap between the respective ranges of consecutive signal addresses used as the signal write destinations by the plurality of ladder programs,
         stop the execution of the plurality of ladder programs, and
         output information on the plurality of ladder programs including the overlapping ranges of consecutive signal addresses.

2. A programming apparatus configured to create a respective ladder program among the plurality of ladder programs to be executed on the programmable controller according to claim 1, the programming apparatus comprising:
   a further processor configured to
      edit the respective ladder program,
      refer to signal address setting information defining consecutive signal addresses used as signal write destinations by the respective ladder program, and
      check whether or not contents of editing of the respective ladder program contradict the consecutive signal addresses defined in the signal address setting information and used as the signal write destinations.

3. A programming apparatus configured to create a respective ladder program among the plurality of ladder programs to be executed on the programmable controller according to claim 1, the programming apparatus comprising:
   a further processor configured to
      create an available address setting table based on signal address setting information defining consecutive signal addresses used as signal write destinations by the respective ladder program,
      compile the respective ladder program into an executable ladder program, and
      embed the available address setting table in the executable ladder program.

* * * * *